United States Patent
Petach et al.

(10) Patent No.: US 10,277,559 B2
(45) Date of Patent: Apr. 30, 2019

(54) METHODS AND SYSTEMS FOR DATA TRAFFIC CONTROL AND ENCRYPTION

(71) Applicant: Yahoo! Inc., Sunnyvale, CA (US)

(72) Inventors: Matthew Nicholas Petach, Sunnyvale, CA (US); Nitin Batta, San Jose, CA (US); Brian LaCroix, Dallas, TX (US); Igor Gashinsky, New York, NY (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 534 days.

(21) Appl. No.: 14/283,944

(22) Filed: May 21, 2014

(65) Prior Publication Data

US 2016/0119294 A1   Apr. 28, 2016

(51) Int. Cl.
*H04L 9/08* (2006.01)
*H04L 29/06* (2006.01)

(52) U.S. Cl.
CPC .......... *H04L 63/0428* (2013.01); *H04L 9/083* (2013.01); *H04L 9/0822* (2013.01)

(58) Field of Classification Search
USPC ........................................................ 713/150
See application file for complete search history.

(56) References Cited

U.S. PATENT DOCUMENTS

| | | | | |
|---|---|---|---|---|
| 6,421,359 B1 * | 7/2002 | Bennett | ............ | H04N 21/23608 370/443 |
| 6,678,835 B1 * | 1/2004 | Shah | ................... | H04L 12/4641 714/4.12 |
| 7,000,121 B2 * | 2/2006 | Jarosz | ..................... | H04L 43/10 713/151 |
| 7,242,766 B1 * | 7/2007 | Lyle | ........................ | H04L 9/12 380/2 |
| 7,428,306 B2 * | 9/2008 | Celikkan | ............... | G06F 21/602 380/28 |
| 7,813,512 B2 * | 10/2010 | Futa | ....................... | H04L 9/0844 380/285 |
| 8,307,003 B1 * | 11/2012 | Sheth | .................. | G06F 17/3089 707/790 |
| 8,781,442 B1 * | 7/2014 | Link, II | ................. | G08G 1/205 455/411 |
| 2001/0021186 A1 * | 9/2001 | Ono | .................. | H04L 29/06027 370/352 |
| 2002/0169955 A1 * | 11/2002 | Bryant, Jr. | ............ | G06F 19/328 713/153 |

(Continued)

FOREIGN PATENT DOCUMENTS

| CN | 1627680 A | * | 6/2005 | ........... G06F 21/445 |
|---|---|---|---|---|
| CN | 1627680 A | * | 6/2005 | ........... G06F 21/445 |

(Continued)

*Primary Examiner* — Farid Homayounmehr
*Assistant Examiner* — Thanh T Le
(74) *Attorney, Agent, or Firm* — Pillsbury Winthrop Shaw Pittman LLP

(57) ABSTRACT

Methods, systems and programming for data traffic control and encryption. In one example, data traffic is received from a first node to be sent to a second node. The health of an encryption pathway between the first node and the second node is determined. The data traffic is sent to the second node over the network without going through the encryption pathway when the encryption pathway is not healthy.

28 Claims, 14 Drawing Sheets

(56) References Cited

U.S. PATENT DOCUMENTS

| | | | |
|---|---|---|---|
| 2003/0026433 A1* | 2/2003 | Matt | H04L 9/083 380/278 |
| 2004/0064698 A1* | 4/2004 | Zhang | G06F 21/34 713/169 |
| 2004/0172549 A1* | 9/2004 | Kojima | G11B 20/00086 713/193 |
| 2004/0193730 A1* | 9/2004 | Vernon | H04L 12/4633 709/245 |
| 2004/0205344 A1* | 10/2004 | Otway | H04L 63/0869 713/169 |
| 2007/0168663 A1* | 7/2007 | Hirai | G06F 21/10 713/169 |
| 2007/0180130 A1* | 8/2007 | Arnold | H04L 69/18 709/230 |
| 2008/0123859 A1* | 5/2008 | Mamidwar | H04L 9/0625 380/278 |
| 2009/0225652 A1* | 9/2009 | Vasseur | H04L 41/0677 370/225 |
| 2009/0265576 A1* | 10/2009 | Blum | H04L 41/026 714/2 |
| 2011/0150223 A1* | 6/2011 | Qi | H04W 12/04 380/273 |
| 2012/0087495 A1* | 4/2012 | Revell | H04L 9/0841 380/47 |
| 2012/0290728 A1* | 11/2012 | Zhang | H04L 61/2015 709/227 |
| 2012/0331295 A1* | 12/2012 | Tseng | H04L 9/3066 713/169 |
| 2013/0145160 A1* | 6/2013 | Bursell | G06F 21/6218 713/168 |
| 2013/0339744 A1* | 12/2013 | Nagai | H04L 63/061 713/182 |
| 2014/0006290 A1* | 1/2014 | Hozanne | H04L 9/3231 705/75 |
| 2014/0189837 A1* | 7/2014 | Maurer | H04W 12/06 726/7 |
| 2014/0337628 A1* | 11/2014 | Amato | H04L 9/0825 713/171 |
| 2015/0124960 A1* | 5/2015 | Morrison | H04L 63/105 380/28 |
| 2015/0163056 A1* | 6/2015 | Nix | H04L 9/0869 380/46 |

FOREIGN PATENT DOCUMENTS

| | | | | |
|---|---|---|---|---|
| KR | 20150018024 A | * | 2/2015 | |
| WO | WO 2007001239 A1 | * | 1/2007 | G06Q 20/12 |
| WO | WO-2007001239 A1 | * | 1/2007 | G06Q 20/12 |
| WO | WO 2013010658 A1 | * | 1/2013 | H04W 12/06 |
| WO | WO-2013010658 A1 | * | 1/2013 | H04W 12/06 |

* cited by examiner

METHODS AND SYSTEMS FOR DATA TRAFFIC CONTROL AND ENCRYPTION

BACKGROUND

1. Technical Field

The present teaching relates to methods, systems, and programming for data traffic control. Particularly, the present teaching is directed to methods, systems, and programming for data traffic control and encryption.

2. Discussion of Technical Background

Data privacy has become a growing concern in the era of the Internet as almost everything is accessible over the Internet nowadays. These concerns include, for example, whether personally identifiable information or other sensitive information about users can be collected and stored by third parties without consent. In response, great efforts have been made by major Internet service providers to protect network data privacy through various means, such as encrypting all data traffic between data centers. Encryption is the process of encoding data in such a way that only authorized parties can understand it. In an encryption scheme, original data is encrypted using an encryption algorithm, turning it into an unreadable cipher text. This is usually done with the use of an encryption key, which specifies how the message is to be encoded. For example, Internet Protocol Security (IPsec) is one of a commonly used protocol suites for securing Internet Protocol (IP) communications by authenticating and encrypting each IP packet of a communication session. IPsec can be used in protecting data flows between a pair of security gateways, such as data traffic between different data centers.

However, in every normal deployment of IPsec encryption at the network layer, the encryption process happens in-line with the data flow. That is, all existing solutions are designed and operate in a "fail-closed" manner, such that if the encryption pathway is not healthy, the data pathway stops passing traffic and breaks all connectivity. The existing solutions cause data packet loss and have an impact to the data streams already in progress when the encryption systems do not function properly.

Therefore, there is a need to provide an improved solution for data traffic control and encryption to solve the above-mentioned problems.

SUMMARY

The present teaching relates to methods, systems, and programming for data traffic control. Particularly, the present teaching is directed to methods, systems, and programming for data traffic control and encryption.

In one example, a method, implemented on at least one machine each having at least one processor, storage, and a communication platform connected to a network for data traffic control is presented. Data traffic is received from a first node to be sent to a second node. The health of an encryption pathway between the first node and the second node is determined. The data traffic is sent to the second node over the network without going through the encryption pathway when the encryption pathway is not healthy.

In another example, a method, implemented on at least one machine each having at least one processor, storage, and a communication platform connected to a network for encryption pathway health check is presented. First data is encrypted at a first node and sent to a second node over the network through an encryption pathway. The encrypted first data is decrypted to generate second data at the second node. The second data is then encrypted at the second node and sent to the first node over the network through the encryption pathway. The encrypted second data is decrypted to generate third data at the first node. The first data is compared with the third data at the first node to determine the health of the encryption pathway between the first node and the second node.

In still another example, a method, implemented on at least one machine each having at least one processor, storage, and a communication platform connected to a network for encryption pathway health check is presented. Encrypted first data is received from a node over the network through an encryption pathway. The encrypted first data is then decrypted to generate second data. The second data is encrypted and sent to the node over the network through the encryption pathway.

In yet another example, a method, implemented on at least one machine each having at least one processor, storage, and a communication platform connected to a network for encryption pathway health check is presented. First data is encrypted and sent to a node over the network through an encryption pathway. Encrypted second data is received from the node over the network through the encryption pathway. The second data is decrypted from the encrypted first data. The encrypted second data is then decrypted to generate third data. The first data is compared with the third data to determine the health of an encryption pathway to the node.

In yet another example, a method, implemented on at least one machine each having at least one processor, storage, and a communication platform connected to a network data traffic encryption is presented. A first encryption key is provided to a first node and a second node. A second encryption key is then provided to the first node and the second node. The second encryption key is encrypted based on the first encryption key when it is provided to the first and second nodes. An encryption pathway is established between the first and second nodes. The first node and the second node communicate through the encryption pathway via the second encryption key In a different example, a system having at least one processor, storage, and a communication platform connected to a network for data traffic control is presented. The system includes a health checking module and a routing module. The health checking module is configured to determine the health of an encryption pathway between a first node and a second node. The routing module is configured to send data traffic received from the first node to the second node over the network without going through the encryption pathway when the encryption pathway is not healthy.

In another example, a system having at least one processor, storage, and a communication platform connected to a network for encryption pathway health check is presented. The system includes a first encrypting module, a first routing module, a first decrypting module, a comparing module, a second encrypting module, and a second decrypting module. The first encrypting module of a first node is configured to encrypt first data. The first routing module of the first node is configured to send the encrypted first data to a second node over the network through an encryption pathway. The second decrypting module of the second node is configured to decrypt the encrypted first data to generate second data. The second encrypting module of the second node is configured to encrypt the second data. The second routing module of the second node is configured to send the encrypted second data to the first node over the network through the encryption pathway. The first decrypting module of the first node is configured to decrypt the encrypted second data to generate third data. The comparing module of the first node is configured to compare the first data with the third data at the first node to determine the health of the encryption pathway between the first node and the second node.

In still another example, a system having at least one processor, storage, and a communication platform connected to a network for encryption pathway health check is presented. The system includes a routing module, an encrypting module, and a decrypting module. The routing module is configured to receive encrypted first data from a node over the network through an encryption pathway. The decrypting module is configured to decrypt the encrypted first data to generate second data. The encrypting module is configured to encrypt the second data. The routing module is further configured to send the encrypted second data to the node over the network through the encryption pathway.

In yet another example, a system having at least one processor, storage, and a communication platform connected to a network for encryption pathway health check is presented. The system includes a routing module, an encrypting module, a decrypting module, and a comparing module. The encrypting module is configured to encrypt first data. The routing module is configured to send the encrypted first data to a node over the network through an encryption pathway and receive encrypted second data from the node over the network through the encryption pathway. The second data is decrypted from the encrypted first data. The decrypting module is configured to decrypt the encrypted second data to generate third data. The comparing module is configured to compare the first data with the third data to determine the health of an encryption pathway to the node.

In yet another example, a system having at least one processor, storage, and a communication platform connected to a network for data traffic encryption is presented. The system includes a key generating module and a data traffic module. The key generating module is configured to provide a first encryption key and a second encryption key to a first node and a second node. The second encryption key is encrypted based on the first encryption key when it is provided to the first and second nodes. The data traffic module is configured to establish between the first node and the second node an encryption pathway through which the first node and the second node communicate via the second encryption key.

Other concepts relate to software for data traffic control and encryption. A software product, in accord with this concept, includes at least one non-transitory machine-readable medium and information carried by the medium. The information carried by the medium may be executable program code data regarding parameters in association with a request or operational parameters, such as information related to a user, a request, or a social group, etc.

In one example, a non-transitory machine readable medium having information recorded thereon for data traffic control is presented. The recorded information, when read by the machine, causes the machine to perform a series of processes. Data traffic is received from a first node to be sent to a second node. The health of an encryption pathway between the first node and the second node is determined. The data traffic is sent to the second node over the network without going through the encryption pathway when the encryption pathway is not healthy.

In another example, a non-transitory machine readable medium having information recorded thereon for encryption pathway health check is presented. The recorded information, when read by the machine, causes the machine to perform a series of processes. First data is encrypted at a first node and sent to a second node over the network through an encryption pathway. The encrypted first data is decrypted to generate second data at the second node. The second data is then encrypted at the second node and sent to the first node over the network through the encryption pathway. The encrypted second data is decrypted to generate third data at the first node. The first data is compared with the third data at the first node to determine the health of an encryption pathway between the first node and the second node.

In still another example, a non-transitory machine readable medium having information recorded thereon for encryption pathway health check is presented. The recorded information, when read by the machine, causes the machine to perform a series of processes. Encrypted first data is received from a node over the network through an encryption pathway. The encrypted first data is then decrypted to generate second data. The second data is encrypted and sent to the node over the network through the encryption pathway.

In yet another example, a non-transitory machine readable medium having information recorded thereon for encryption pathway health check is presented. The recorded information, when read by the machine, causes the machine to perform a series of processes. First data is encrypted and sent to a node over the network through an encryption pathway. Encrypted second data is received from the node over the network through the encryption pathway. The second data is decrypted from the encrypted first data. The encrypted second data is then decrypted to generate third data. The first data is compared with the third data to determine the health of an encryption pathway to the node.

In yet another example, a non-transitory machine readable medium having information recorded thereon for data traffic encryption is presented. The recorded information, when read by the machine, causes the machine to perform a series of processes. A first encryption key is provided to a first node and a second node. A second encryption key is then provided to the first node and the second node. The second encryption key is encrypted based on the first encryption key when it is provided to the first and second nodes. An encryption pathway is established between the first and second nodes. The first node and the second node communicate through the encryption pathway via the second encryption key.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
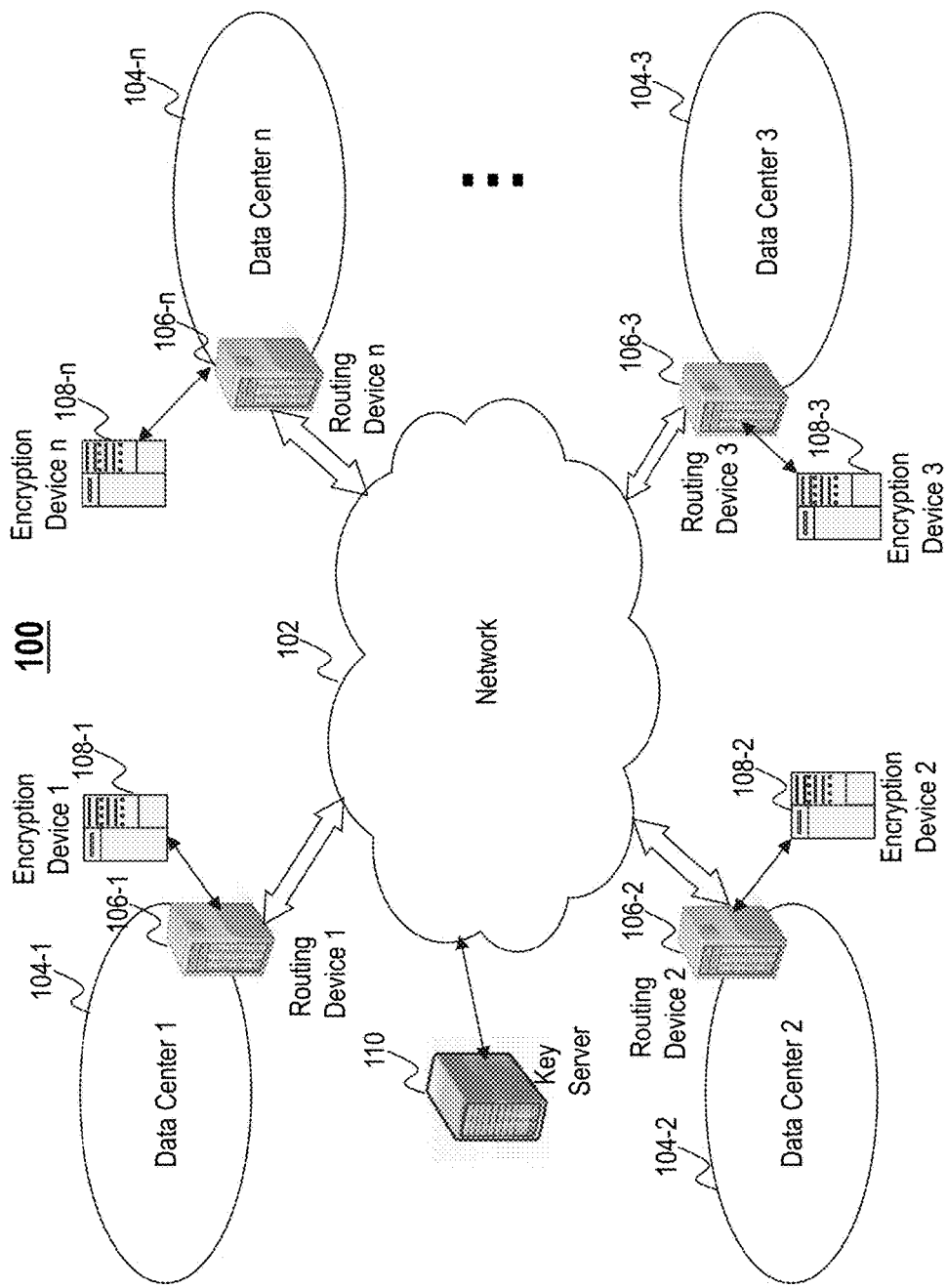
FIG. 1 is an exemplary networked environment in which the present teaching is applied, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present teaching describes methods, systems, and programming aspects of data traffic control and encryption. The methods and systems in the present teaching prioritize successful transport of data over absolute security, enabling dynamic, opportunistic data encryption with hitless failover to clear-text when necessary. For example, the methods and systems in the present teaching move the encryption devices out of the physical pathway, and construct logical data flows that would put traffic through the encryption devices if they are up and function, but would shift traffic off the encryption pathway if it ceased to function properly, with no packet loss and no impact to the data streams already in progress. As soon as encryption capability is restored, the methods and systems resume encrypting traffic seamlessly without human intervention. Moreover, the methods and systems in the present teaching provide a novel bootstrapping scheme of establishing encryption pathways with zero knowledge of initial or subsequent encryption keys, which prevents the risk of revealing private keys used in data traffic encryption. Furthermore, the methods and systems in the present teaching can be easily scaled up by adding encryption devices horizontally to grow its encryption capacity.

Additional novel features will be set forth in part in the description which follows, and in part will become apparent to those skilled in the art upon examination of the following and the accompanying drawings or may be learned by production or operation of the examples. The novel features of the present teaching may be realized and attained by practice or use of various aspects of the methodologies, instrumentalities and combinations set forth in the detailed examples discussed below.

FIG. 1 is an exemplary networked environment in which the present teaching is applied, according to an embodiment of the present teaching. The networked environment 100 in this embodiment includes a network 102 and a plurality of data centers 104-1, 104-2, 104-3, . . . 104-n, and at least one key server 110. Each of the data centers 104-1, 104-2, 104-3, . . . 104-n may be a cluster of computing devices, e.g., servers, and associated components, e.g., communication devices or storages. The network 102 may couple devices so that communications may be exchanged, such as between a server and a client device or other types of devices, including between wireless devices coupled via a wireless network, for example. The network 102 may also include mass storage, such as network attached storage (NAS), a storage area network (SAN), or other forms of computer or machine readable media, for example. The network 102 may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

Data packets communicated via the network 102, such as a network of participating digital communication networks, may be compatible with or compliant with one or more protocols. Data formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. Data packets may be communicated between nodes of a network, such as, for example, to one or more sites employing a local network address. A data packet may, for example, be communicated over the Internet from a user site via an access node coupled to the Internet. Likewise, a data packet may be forwarded via network nodes to a target site coupled to the network via a network access node, for example. A data packet communicated via the Internet may, for example, be routed via a path of gateways, servers, etc. that may route the signal packet in accordance with a target address and availability of a network path to the target address.

In this embodiment, the network 102 is the Internet, and the data centers 104-1, 104-2, 104-3, . . . 104-*n* communicate with each other through the use of gateways according to the Internet Protocol (IP). Each gateway may be a server that is part of the respective data center 104-1, 104-2, 104-3, . . . 104-*n* or a proxy server that is coupled to the respective data center 104-1, 104-2, 104-3, . . . 104-*n*. In this embodiment, a gateway includes a routing device 106-1, 106-2, 106-3, . . . 106-*n*. The routing devices 106-1, 106-2, 106-3, . . . 106-*n* may include any networking devices that provide a common method of routing data packets between the data centers 104-1, 104-2, 104-3, . . . 104-*n*, such as routers, network switches, network hubs, etc. In one example, the routing devices 106-1, 106-2, 106-3, . . . 106-*n* are Juniper MX series routers. Once data traffic from a data center 104-1, 104-2, 104-3, . . . 104-*n* is received, a corresponding routing device 106-1, 106-2, 106-3, . . . 106-*n* reads the address information in the data packet to determine its destination and uses information in its routing table or routing policy to direct the data traffic to the destination. In addition to the routing devices 106-1, 106-2, 106-3, . . . 106-*n* at the gateways of the data centers 104-1, 104-2, 104-3, . . . 104-*n*, back end routing devices (not shown) may be included as part of the network 102 to relay data packets passed between the data centers 104-1, 104-2, 104-3, . . . 104-*n*.

In this embodiment, each gateway of the respective data center 104-1, 104-2, 104-3, . . . 104-*n* also includes an encryption device 108-1, 108-2, 108-3, . . . 108-*n*, which is coupled to the corresponding routing device 106-1, 106-2, 106-3, . . . 106-*n*. The encryption devices 108-1, 108-2, 108-3, . . . 108-*n* may be any suitable devices that convert data into a form that is not easily understood by unauthorized parties. It is understood that each encryption device 108-1, 108-2, 108-3, . . . 108-*n* may also perform decryption function (as a decryption device) that converts encrypted data back into its original form. That is, each of the encryption devices 108-1, 108-2, 108-3, . . . 108-*n* disclosed herein may act as a decryption device as well. In one example, the encryption devices 108-1, 108-2, 108-3, . . . 108-*n* are Cisco ASR 1013 routers. The encryption devices 108-1, 108-2, 108-3, . . . 108-*n* may use various protocols, such as IPsec, for securing IP communication by encrypting data packets of a communication session between two data centers. In one example, the routing devices 106-1, 106-2, 106-3, . . . 106-*n* may be connected to the encryption devices 108-1, 108-2, 108-3, . . . 108-*n* through a set of network switches, which allow for adding additional encryption devices, or removing existing ones, without having to impact the connections to the routing devices 106-1, 106-2, 106-3, . . . 106-*n* themselves. Each routing device 106-1, 106-2, 106-3, . . . 106-*n* may have a Border Gateway Protocol (BGP) neighbor relationship configured with each encryption device 108-1, 108-2, 108-3, . . . 108-*n*, which allows the encryption device 108-1, 108-2, 108-3, . . . 108-*n* and the routing device 106-1, 106-2, 106-3, . . . 106-*n* to dynamically pass routing updates to each other in real-time.

In this embodiment, one or more key servers 110 are coupled to each of the encryption device 108-1, 108-2, 108-3, . . . 108-*n* through the network 102, which are responsible for generating encryption key(s) for encrypting data traffic between the data centers 104-1, 104-2, 104-3, . . . 104-*n*. The encryption key referred to herein may be a piece of information (or a parameter) that determines the functional output of a cryptographic algorithm or cipher applied to the data to be encrypted. In encryption, the encryption key specifies the particular transformation of the original data into cipher text. Any known types of encryption keys may be generated by the key server 110, such as but not limited to Rivest-Shamir-Adleman (RSA) keys and Internet Security Association and Key Management Protocol (ISAKMP) keys, based on any suitable key management protocol, such as Group Domain of Interpretation (GDOI) protocol. As described below in detail, the encryption keys may be randomly and dynamically generated and rotate on a regular basis to ensure security.

In this embodiment, for example, the routing device 106-1 receives data traffic from the corresponding data center 104-1 and then may forward it to the corresponding encryption device 108-1 for data encryption. The encrypted data traffic is then sent back to the routing device 106-1 and is directed to the routing device 106-*n* of the destination data center 104-*n*. The encrypted data traffic is decrypted by the encryption device 108-*n* of the destination data center 104-*n* and is forwarded to the data center 104-*n* by the routing device 106-*n*. In other words, an encryption pathway may be established between two data centers 104-1, 104-*n* through the routing devices 106-1, 106-*n*, the encryption device 108-1, 108-*n*, and the network 102. In this example, the encryption pathway is bi-directional such that data traffic from the data center 104-*n* to the data center 104-1 may be encrypted and decrypted in a similar manner. Data privacy of traffic passing through the encryption pathway between the two data centers 104-1, 104-*n* is protected by data encryption in this example. As described in detail below, the heath of an encryption pathway between two data centers 104-1, 104-2, 104-3, . . . 104-*n* are checked at a regular interval. When the encryption pathway becomes unhealthy due to any reasons, such as but not limited to malfunctioning of an encryption device 108-1, 108-2, 108-3, . . . 108-*n*, the data traffic is automatically switched from the encryption pathway to the non-encryption pathway such that the data traffic can be continuously transmitted in a non-encrypted form, e.g., clear text mode, without being interrupted or suffering data loss. In one example, notices or alerts may be provided to a network administrator or recorded in log files when data traffic is being passed unencrypted. As the health of the encryption pathway is checked on a regular basis, once it is determined that the encryption pathway is back to normal, the data traffic is automatically switched back to the encryption pathway to resume data encryption. In other words, the data traffic control and encryption in the networked environment 100 in this embodiment operate in a "fail-open" manner, as opposed to the "fail-closed" manner employed by known solutions.

It is understood that although data traffic in the embodiment of FIG. 1 is transmitted between data centers 104-1, 104-2, 104-3, . . . 104-*n*, the data traffic may be passed between nodes of any suitable types that are coupled with each other through the network 102. In one example, a pair of nodes may be a client computer of an end-user and a remote server or data center. In another example, the pair of nodes may be both client computers of end-users. In still another example, the pair of nodes may be two networks (e.g., LANs) that are coupled to the Internet. Depending on the different types of nodes, the networking and encryption protocol is not limited to IPsec, and may include, for example, Hypertext Transfer Protocol Secure (HTTPS), Secure Sockets Layer (SSL), Transport Layer Security (TLS), Secure Shell (SSH), or any other suitable protocols as known in the art. Also, each data center 104-1, 104-2, 104-3, . . . 104-*n* in the embodiment of FIG. 1 may be connected as a fully connected mesh topology such that any pair of two data centers 104-1, 104-2, 104-3, . . . 104-*n* may have an encryption pathway therebetween for transmitting encrypted data traffic. It is understood that in other embodiments, the network topology of nodes is not limited to the fully connected mesh topology and may include, for example, point-to-point, bus, start, ring, tree, or any other suitable topology as known in the art.

Figure 2:
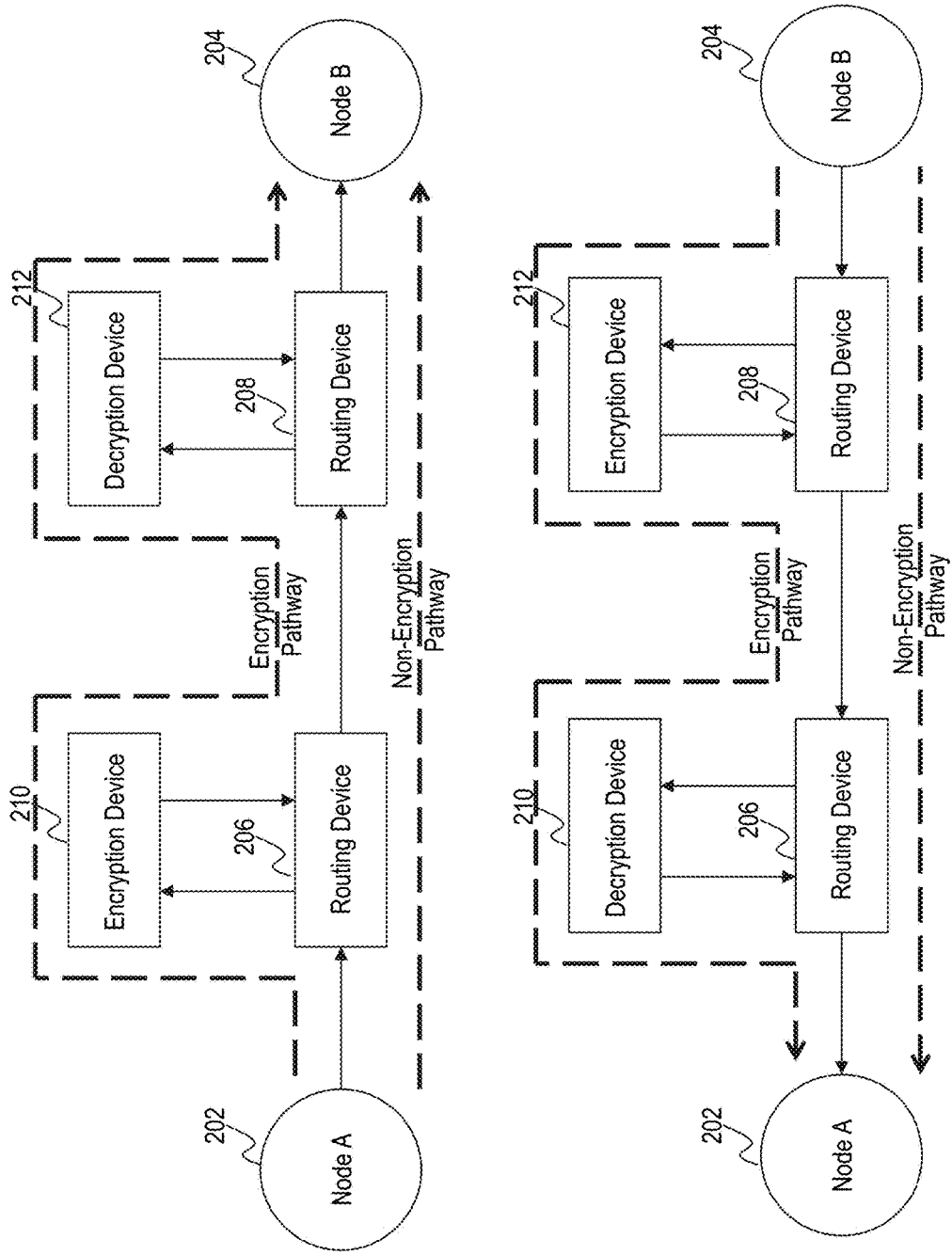
FIG. 2 depicts exemplary bi-directional encryption pathway and non-encryption pathway between two nodes, according to an embodiment of the present teaching.

FIG. 2 depicts exemplary bi-directional encryption pathway and non-encryption pathway between two nodes, according to an embodiment of the present teaching. Node A 202 and node B 204 in this embodiment may include a client device of an end-user, a cluster of computing devices, such as a data center, a LAN, etc. As shown in FIG. 2, bi-directional data traffic between node A 202 and node B 204 is directed by at least two routing devices 206, 208. The routing device 206 is configured to receive data traffic from node A 202, and the routing device 208 is configured to receive data traffic from the node B 204. Although in FIG. 2, the routing devices 206, 208 are shown as being separate from node A 202 and node B 204, respectively, it is understood that in other examples, for example when node A 202 and node B 204 represent data centers, each routing device 206, 208 may be part of the corresponding node A 202 and node B 204 (e.g., as a gateway server of the data center). In this example, each routing device 206, 208 is coupled to a corresponding encryption/decryption device 210, 212. As described above, the same device may act as both encryption and decryption devices as needed. When data traffic is transmitted from node A 202 to node B 204, the near end (node A) encryption device 210 encrypts the data traffic while the far end (node B) decryption device 212 decrypts the encrypted data. If the data traffic direction is reversed, then the near end (node B) encryption device 212 encrypts the data traffic while the far end (node A) decryption device 210 decrypts the encrypted data.

A bi-directional encryption pathway in this embodiment may be established between node A 202 and node B 204 through the routing device 206 and encryption/decryption device 210 of node A 202 and the routing device 208 and encryption/decryption device 212 of node B 204. A bi-directional non-encryption pathway in this embodiment may also be established between node A 202 and node B 204 through the routing device 206 of node A 202 and the routing device 208 of node B 204. Depending on the health of the encryption pathway, data traffic may be seamlessly switched between the encryption pathway and the non-encryption pathway without human intervention. For example, the outage of any encryption device, which affects the encryption and/or decryption capability of the encryption pathway, will cause shifting data traffic off the encryption pathway. As soon as the encryption capability is restored, the encrypting of data traffic will be resumed. In other words, encryption capability and routing capability in this embodiment are separate from each other such that the loss of the encryption capability would not hurt the availability of data traffic; the decision of whether the data traffic passes through the encryption pathway or non-encryption pathway is made separately from the process of encrypting the data traffic itself.

In one embodiment, each routing device 206, 208 may have a first forwarding instance defined for handling traffic that needs to be decrypted, as well as a second forwarding instance for each destination node for which traffic may need to be encrypted. The encryption devices 210, 212 may send specific /32 and /128 prefixes (host prefixes) to the routing devices 206, 208, one each for all decryption traffic, and a different one for the destination far end node for which traffic may need to be encrypted. Each of those host prefixes may correspond to a specific loopback interface on the encryption devices 210, 212. For example, traffic needing to be encrypted to a destination node is handled by a loopback, e.g., loopback 10, on an encryption device; the IP address for loopback 10 may be passed from the encryption device to the routing device as a BGP route update. When the routing device receives that BGP update, it installs the route in the specific forwarding instance associated with the destination node as the next-hop address for data traffic. Thus, any traffic on the routing device that is sent to the forwarding instance for the destination node will see the next-hop address in that forwarding instance being learned by BGP from the encryption device, and the next-hop address in this case would be the IP address of loopback 10 on the encryption device. Likewise, in this example, the routing device has a different forwarding instance for traffic destined to a different far end node, and that forwarding instance learns its next-hop address for data traffic by BGP from the encryption device, which will send out the IP address of another loopback, e.g., loopback 11, as the next-hop address for data traffic destined for the other far end node. This pairing of loopback addresses to BGP announcements going from the encryption devices to the routing devices, and thus into the forwarding instance associated with a particular node is repeated for every destination site, one loopback address for each forwarding instance on the routing.

In one embodiment, traffic coming into each routing device 206, 208 from a node may be passed through an access control list (ACL) which has specific rules for how to handle different types of data. Data traffic which does not need to be encrypted may be allowed past the encryption rules to avoid double-encrypting traffic unnecessarily; however, if security rules deem it necessary, those bypass rules may be removed so that data traffic is subject to encryption at the network layer, even if it was already pre-encrypted. Next in the ACL may be separate rules, one per destination node, which match traffic that should be passed to the encryption devices 210, 212. Each destination node may have a specific term in the ACL which matches all IP destinations that reside within that destination node. For example, there may be two actions within each node term: the first action that specifies that the traffic should be placed in the Differentiated Services Code Point (DSCP) Assured Forwarding 11 (af11) queue; the final action for that ACL term that passes data traffic to the specific forwarding instance corresponding to the destination node. Within the forwarding instance, the next-hop address learned for the default route may be the BGP-learned-prefix from the encryption devices 210, 212 matching the loopback address on the device for that node. The data packets follow that default route to the next-hop address, which is on the encryption devices 210, 212. As the data packets enter the encryption devices 210, 212, the original header is copied, the original packet is encrypted, marked with an encryption header, and then the original packet header is placed back on it (with the original source IP address, original destination IP address, and that DSCP af11 tagging). The encrypted packet may be then sent back to the routing devices 206, 208, where it is processed as normal, and passed through the network towards its destination node.

In one embodiment, at the destination far end node, data traffic enters the routing devices 206, 208, where it is passed through an ACL which again determines how the traffic will be handled. For example, if the packets coming in are encrypted packets (e.g., Encapsulating Security Payload (ESP) protocol), and match DSCP code point af11, they are sent to a special forwarding instance for handling traffic needing to be decrypted. That forwarding instance again has a next-hop address learned via BGP from the encryption devices 210, 212. In this case, the next-hop address may be learned from a special loopback, e.g., loopback 90, which is used for all traffic needing to be decrypted. The data traffic may follow the default route in this forwarding instance across to the encryption devices 210, 212, where the traffic passes through the crypto-map on the interface, and is decrypted: the packet header is removed, the resulting payload is de-encrypted, and the resulting original packet is revealed. As the packets are sent back from the decryption devices 210, 212 to the routing devices 206, 208 (now unencrypted), the DSCP tag af11 may be removed from the packets, so that when the packets arrive at the destination node, they will be exactly as they looked when they departed the origin node. Accordingly, a bi-directional encryption pathway in FIG. 2 may be established between node A 202 and node B 204 through the routing device 206 and encryption/decryption device 210 of node A 202 and the routing device 208 and encryption/decryption device 212 of node B 204.

A bi-directional non-encryption pathway in FIG. 2 may also be established between node A 202 and node B 204 through the routing device 206 of node A 202 and the routing device 208 of node B 204. In one embodiment, in each of the node-specific encryption forwarding instances, a secondary default route may be added with a less-preferred administrative cost, which passes traffic back out of the specialized forwarding instance back into the main routing instance on the routing devices 206, 208. Because that secondary route can be installed into the forwarding instance with a less preferred administrative cost, it may be used only if there is no remaining next-hop address being learned for the main default route from any of the encryption devices 210, 212. That is, as long as at least one of the encryption devices 210, 212 is advertising a next-hop address for the primary default route in the forwarding instance, traffic will flow through the encryption devices 210, 212 and be encrypted; but the moment the last BGP-learned next-hop route is lost, traffic will then fall back to use the less-preferred default route, which does not send the traffic to the encryption devices 210, 212 (and does not tag the traffic with DSCP code point af11); instead, the traffic simply gets re-evaluated in the normal routing table, and passes to the destination note unencrypted. At the destination far end node, since the packet does not match protocol ESP, and does not have DSCP code point af11 on it, it will be sent like normal to the destination node. In other words, if for any reason, the encryption pathway becomes unavailable, rather than having traffic fall on the floor, the traffic is instead passed in clear text until the encryption pathway comes back online, at which point the traffic may be immediately and transparently begin passing through the encryption pathway again.

Figure 3:
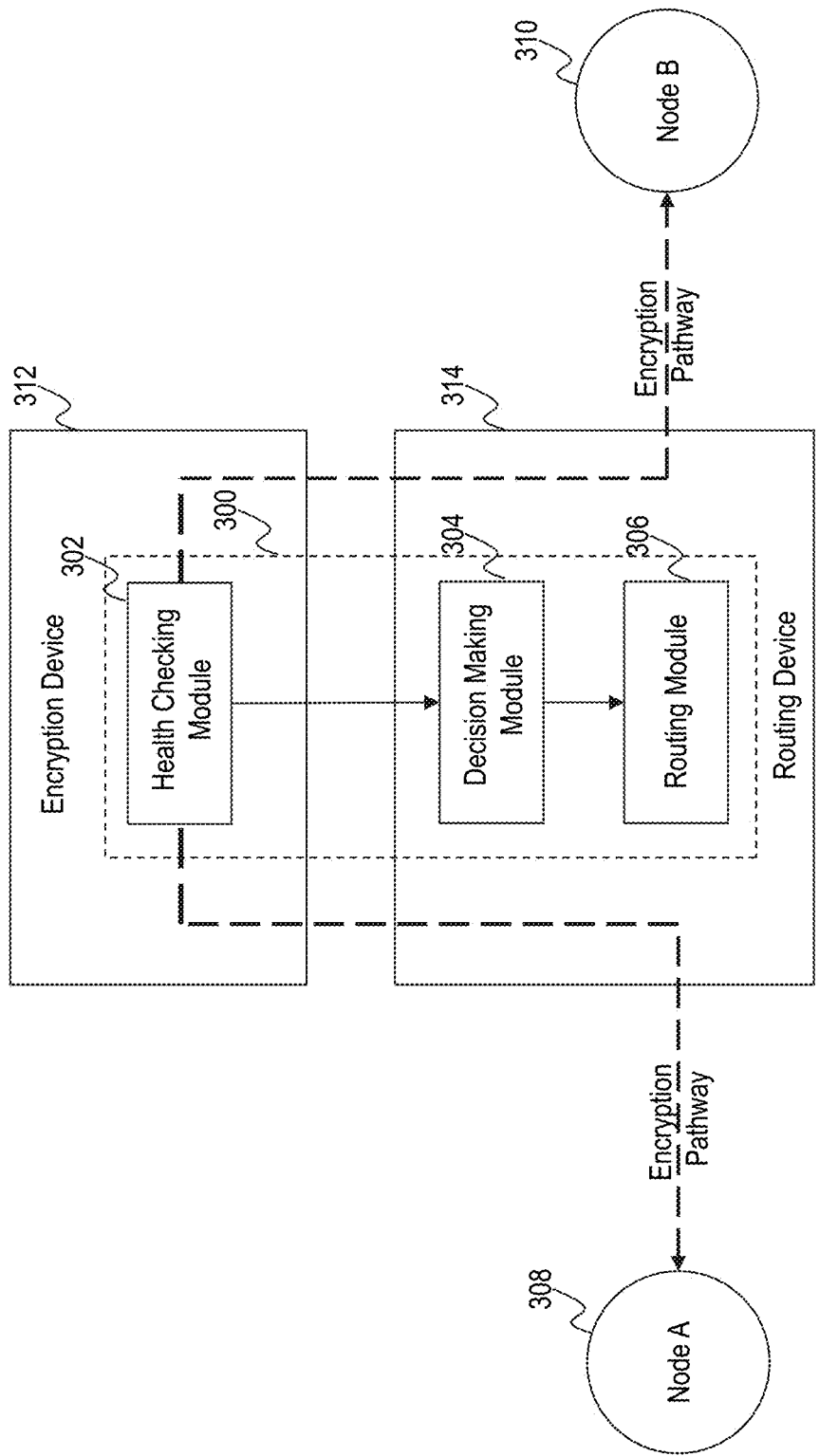
FIG. 3 is an exemplary system diagram of a system for data traffic control, according to an embodiment of the present teaching.

FIG. 3 is an exemplary system diagram of a system for data traffic control, according to an embodiment of the present teaching. The system 300 in this embodiment includes a health checking module 302, a decision making module 304, and a routing module 306. Each of the modules referred to herein may be any suitable software module, hardware, firmware or any suitable combination thereof that can perform the desired function. The system 300 controls the data traffic between node A 308 and node B 310. In particular, the system 300 in this embodiment switches the data traffic between an encryption pathway and a non-encryption pathway based on the health of the encryption pathway.

In this embodiment, the health checking module 302 resides on an encryption device 312 and configured to constantly check the health of the encryption pathway between node A 308 and node B 310 a regular interval. In one example, the health checking module 302 may be a software module executed by one or more processors of the encryption device 312. In this embodiment, the encryption device 312 may be either the near end encryption device of node A or the near end encryption device of node B, depending on the direction of the data traffic. It is understood that in other embodiments, the health checking module 302 may be a standalone component. In this embodiment, the health checking module 302 may periodically send instructions to both the near end routing device 314 of node A and the far end routing device (not shown) of node B 310 to perform a heath check procedure. In one example, the instructions are sent to routing devices according to a gateway protocol, such as BGP, at a frequency that is determined based on the scale of the network (e.g., the number of nodes, encryption capacity, etc.). If a node communicates with multiple nodes, then the near end health checking module 302 may perform the health check with respect to each of the multiple nodes. In this embodiment, the instructions to the routing devices cause the routing devices to route a test message through the bi-directional encryption pathway and check whether the near end and far end encryption devices can correctly encrypt and decrypt the test message. The detail of the heath check procedure is described below with respect to FIGS. 5-7.

The decision making module 304 in this embodiment receives an update of the heath of the encryption pathway from the health checking module 302 and makes a decision as to whether the data traffic shall go through the encryption pathway or not. A predefined criterion may be provided to the decision making module 304 for making the decision. In one example, the number of failures in the health check procedure within a certain time period may be used as a criterion to determine whether the data traffic shall be shifted off the encryption pathway. Other suitable criteria, such as a time out threshold of the health checking module 302, may be applied by the decision making module 304 as well. The decision is provided to the routing module 306, which is configured to control the routing function of the routing device 314. The routing module 306 may send data traffic received from the near end node A 308 to the far end node B 310 without going through the encryption pathway when the encryption pathway is not healthy. In one example, the decision making module 304 may cause removing the encryption device 312 from the routing table of the routing module 306 via BGP instructions in order to shift data traffic off the encryption pathway. The routing module 306 may send data traffic received from the near end node A 308 to the far end node B 310 through the encryption pathway when the encryption pathway becomes healthy. In this embodiment, the decision making module 304 resides on the routing device 314. In one example, the decision making module 304 may be a software module executed by one or more processors of the routing device 314. It is understood that in other embodiments, the decision making module 304 may reside on the encryption device 312 or may be a standalone component.

In one embodiment, health checks may run at a regular interval, e.g., every five seconds, on every encryption device, checking every destination node with multiple probes. The moment the health check probes to a specific destination node all fail within the regular interval period, the loopback interface corresponding with that destination node on the encryption device 312 may be shut down by a script running on the encryption device 312. As soon as that loopback interface is shut down, the route is withdrawn from routing table by BGP, and traffic stops flowing into the encryption device 312 for that destination node. The moment the health checks all pass successfully again for that destination node, the corresponding loopback interface may be re-enabled, which causes the route to be advertised via BGP to the routing device 314 again, at which point traffic will again begin flowing from the routing device 314 to the encryption device 312 to be encrypted for the destination node. In this embodiment, those always-running health check scripts make up the opportunistic aspect of the data traffic control and encryption system as they ensure that traffic only ever passes through encryption devices that are themselves certain they can encrypt and send traffic to the destination node successfully.

Figure 4:
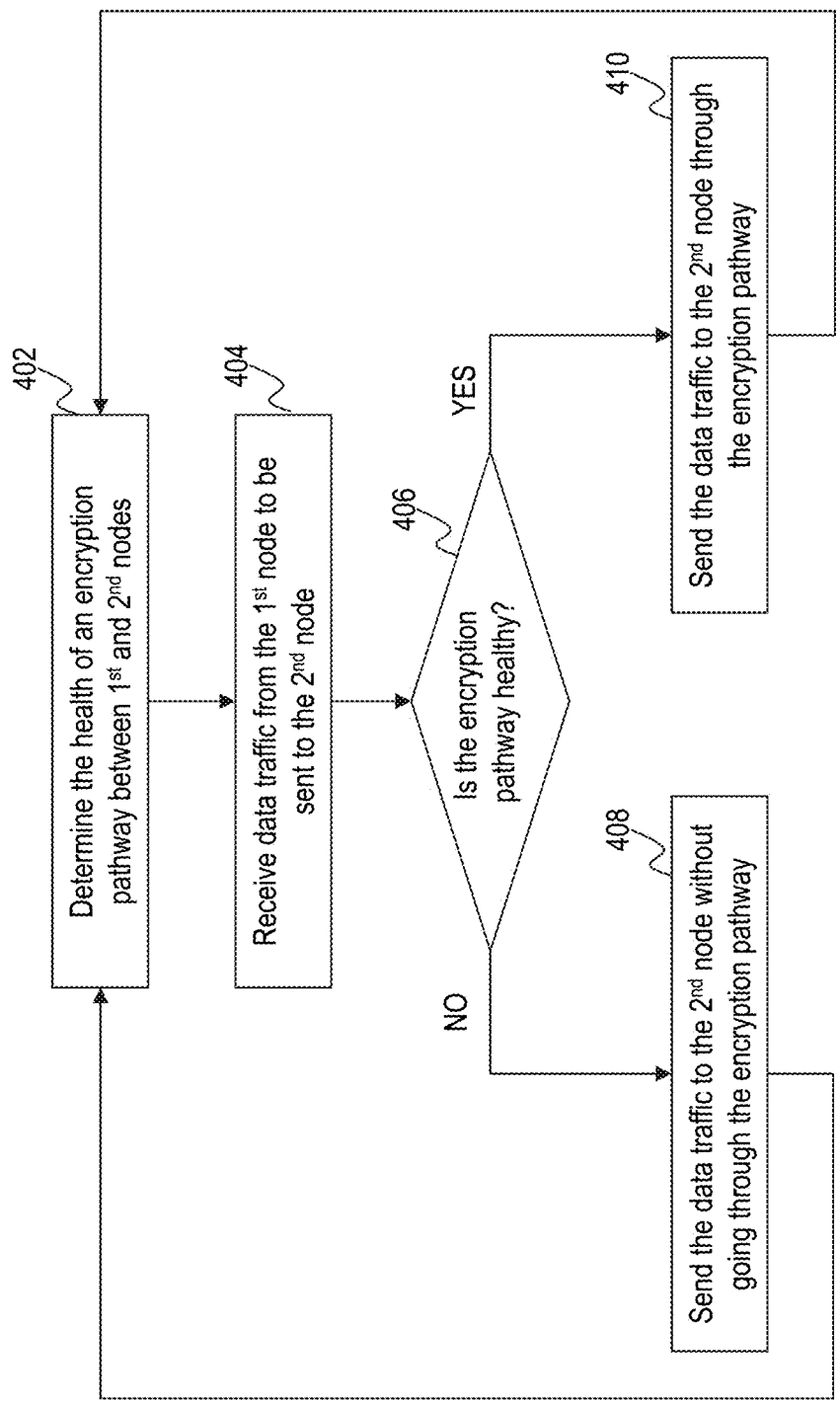
FIG. 4 is a flowchart of an exemplary process for data traffic control, according to an embodiment of the present teaching.

FIG. 4 is a flowchart of an exemplary process for data traffic control, according to an embodiment of the present teaching. At 402, the heath of an encryption pathway between a first node and a second node is determined. The health check may be performed by the health checking module 302 by constantly sending BGP instructions to the routing devices of the first and second nodes. At 404, data traffic from the first node to be sent to the second node is received, for example, by the routing module 306 of the routing device 314. The routing device 314 may be part of the first node, such as a gateway router of a data center, or a near end router coupled to the first node. It is understood that although 404 occurs after 402 in FIG. 4, as the health checking at 402 is constantly performed, the particular sequence of 402 and 404 is not limited by FIG. 4. That is, the health checking module 302 and the routing module 306 may act separately. At 406, depending on the health check result, i.e., whether the encryption pathway is healthy or not, a decision is made as to whether the data traffic is sent to the second node through the encryption pathway or not. The decision may be made by the decision making module 304 according to a predefined criterion. At 408, the data traffic is sent to the second node without going through the encryption pathway when the encryption is not healthy. Or, at 410, the data traffic is sent to the second node through the encryption pathway when the encryption is healthy. Either way, the data traffic can continuously flow regardless of whether the encryption pathway is healthy or not. As described above, as the health checking is performed constantly, the process is repeated at a regular interval. In this way, the encryption of data traffic may be automatically resumed once the encryption pathway is back to normal.

Figure 5:
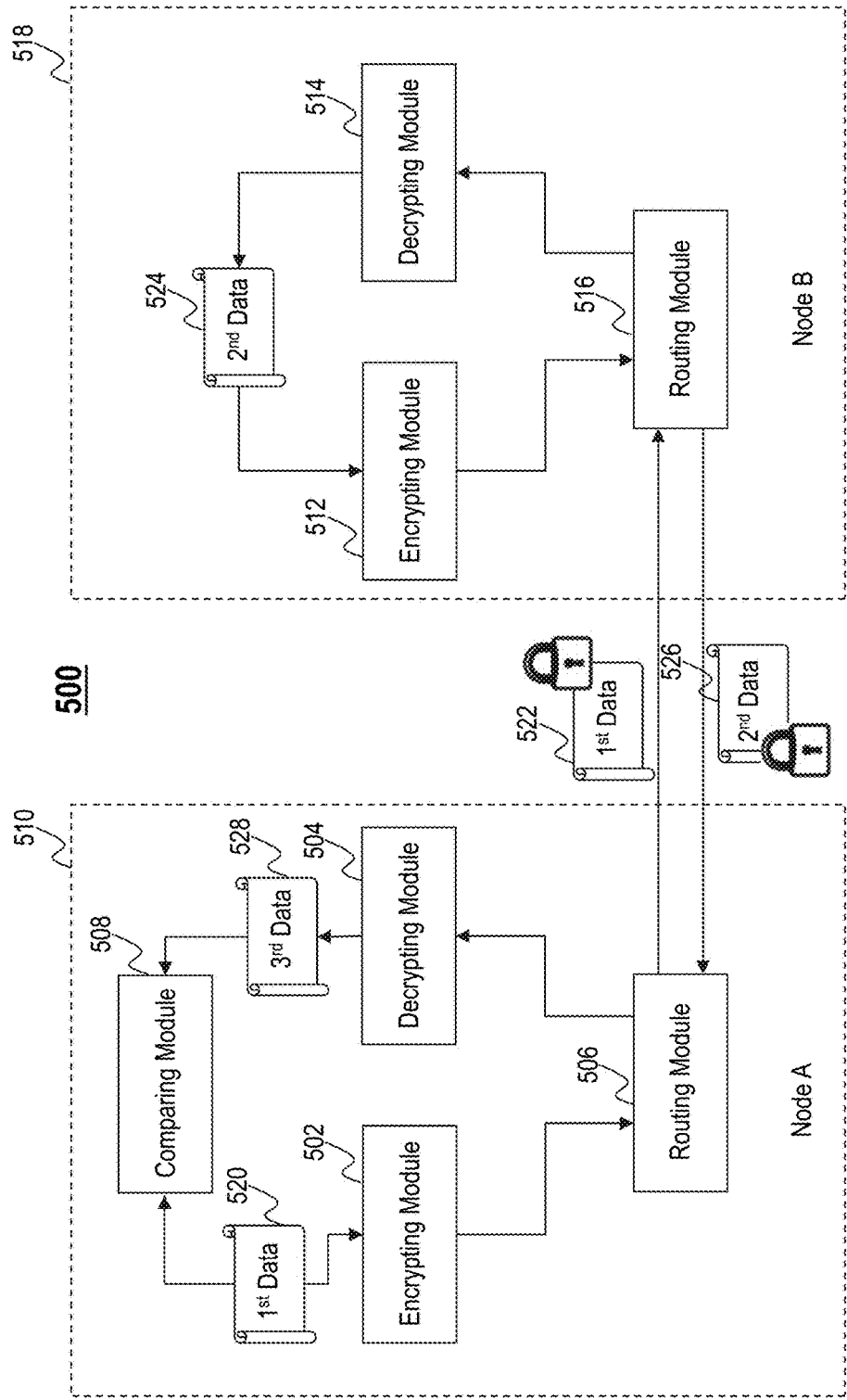
FIG. 5 is an exemplary system diagram of a system for encryption pathway health check, according to an embodiment of the present teaching.

FIG. 5 is an exemplary system diagram of a system for encryption pathway health check, according to an embodiment of the present teaching. The system 500 in this embodiment includes an encrypting module 502, a decrypting module 504, a routing module 506, and a comparing module 508 of the near end node A 510, and an encrypting module 512, a decrypting module 514, and a routing module 516 of the far end node B 518. Each of the modules referred to in this embodiment may be any suitable software, hardware, firmware or any suitable combination thereof that can perform the desired function as described below. At the near end node A 510, first data 520 is provided to the encrypting module 502 for encryption based on an encryption key. In this embodiment, the first data 520 is a test message for encryption pathway health check. It is understood that, however, the first data 520 may be normal traffic data in other examples. The routing module 506 of the near end node A 510 then sends the encrypted first data 522 over a network to the routing module 516 of the far end node B 518.

The routing module 516 of the far end node B 518, once receives the encrypted first data 522, forwards it to the decrypting module 514 of the far end node B 518. Using the same encryption key that have been provided to both node A 510 and node B 518, the decrypting module 514 of the far end node B 518 decrypts the encrypted first data 522 to generate second data 524. In decryption, the encryption key specifies the reversed transformation from cipher text into the original form of the data, i.e., plain text. In one example, the second data 524 may be compared with the first data 520 to see if they match each other. A match may indicate that the encryption at the near end node A 510 and decryption at the far end node B 518 work properly and the encryption pathway in one direction (from node A 510 to node B 518) is healthy. However, in this embodiment, the health checking is designed for checking whether a bi-directional encryption pathway work properly in both directions. Thus, the encryption module 512 of the far end node B 518 encrypts the second data 524 again based on the same encryption key known by both node A 510 and node B 518. The routing module 516 of the far end node B 518 then sends the encrypted second data 526 back to the near end node A 510.

The routing module 506 of the near end node A 510, once receives the encrypted second data 526, forwards it to the decrypting module 504 of the near end node A 510. Using the same encryption key, the decrypting module 504 of the near end node A 510 decrypts the encrypted second data 526 to generate third data 528. The comparing module 508 compares the third data 528 and the first data 520 to determine whether they match each other according to a criterion. The criterion may be a 100% match, or any other percentage that has been predefined (e.g., 99.99%, etc.). If a match is found by the comparing module 508, the health check process for the encryption pathway then returns a result of "healthy." Otherwise, the encryption pathway is determined "unhealthy." It is understood that due to the outage of any device or component in the encryption pathway, it is possible that the third data cannot even be generated. Thus, in some embodiments, a time out threshold may be set such that if there is no third data has been generated within the threshold, the health check is failed and the encryption pathway is deemed "unhealthy." The modules in this embodiment may collectively perform the health check procedure that is instructed and controlled by the health checking module 302 in FIG. 3.

Figure 6:
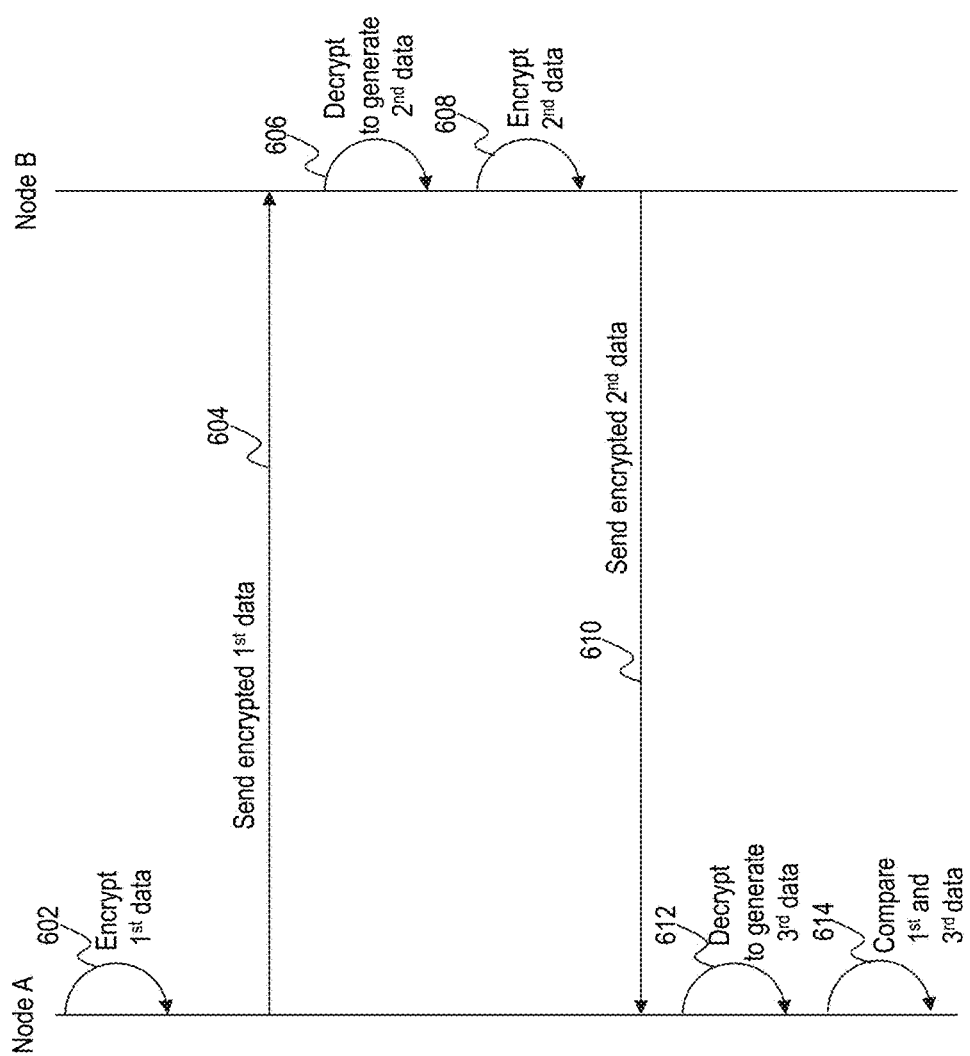
FIG. 6 is an exemplary timeline chart for encryption pathway health check, according to an embodiment of the present teaching.

FIG. 6 is an exemplary timeline chart for encryption pathway health check, according to an embodiment of the present teaching. Starting at time 602, first data, for example a test message, is encrypted at node A based on an encryption key. At time 604, the encrypted first data is sent to node B over a network through a bi-directional encryption pathway between node A and node B. At time 606, at node B, the encrypted first data is decrypted to generate second data. At time 608, the second data is encrypted again using the same encryption key at node B. At time 610, the encrypted second data is sent back to node A over the network through the bi-directional encryption pathway. At time 612, at node A, the encrypted second data is decrypted to generate third data. At time 614, the first data is compared with the third data at node A to determine the heath of the bi-directional encryption pathway based on, for example, whether a match can be found according to a criterion.

Figure 7:
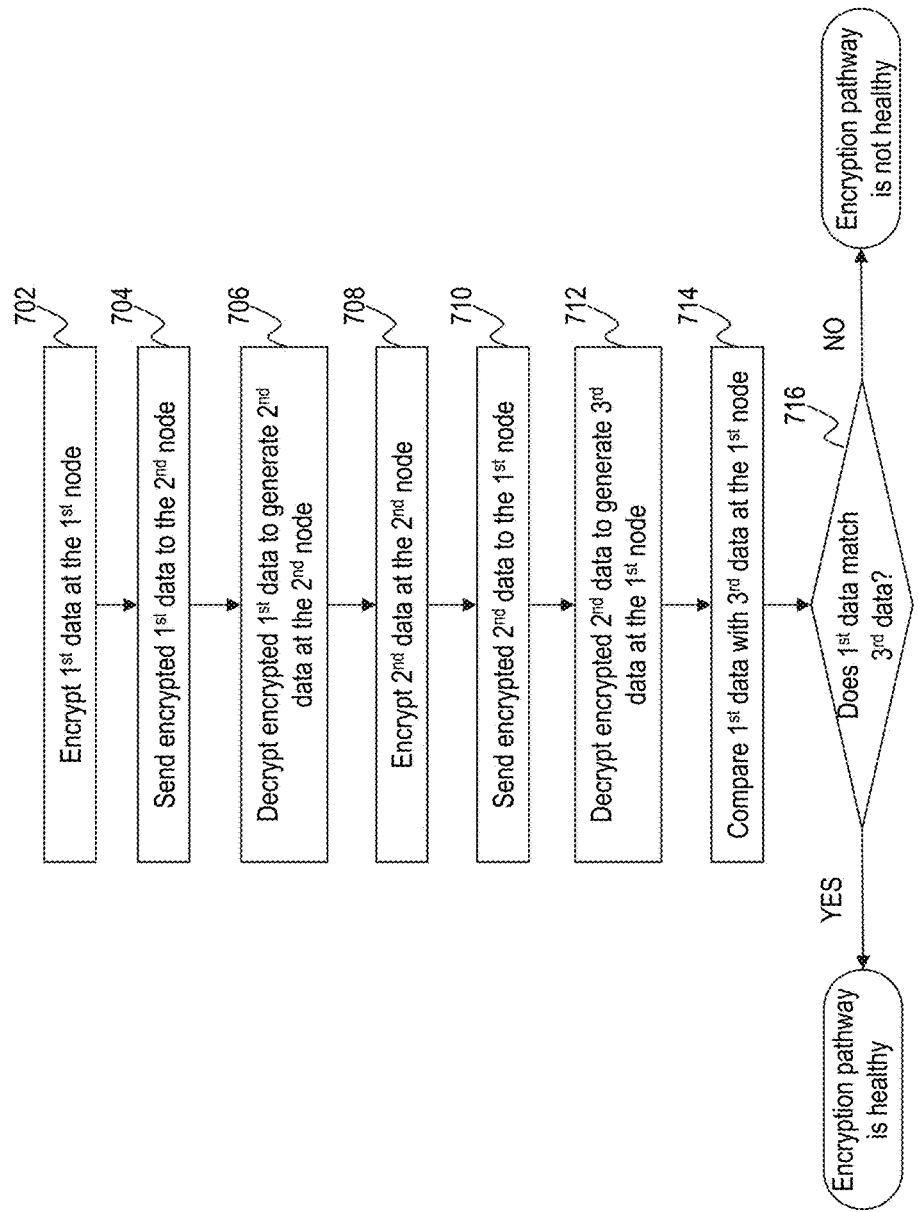
FIG. 7 is a flowchart of an exemplary process for encryption pathway health check, according to an embodiment of the present teaching.

FIG. 7 is a flowchart of an exemplary process for encryption pathway health check, according to an embodiment of the present teaching. At 702, first data is encrypted at a first node. The first data may be either a test message or normal traffic data. The first data may be encrypted based on an encryption key by the encrypting module 502 of a near end node. At 704, the encrypted first data is sent to a second node over a network through an encryption pathway between the first and second nodes. This may be performed by the routing module 506 of the near end node. The first and second nodes may include client devices of end-users, remoter servers, clusters or data centers, or LANs. At 706, the encrypted first data is decrypted at the second node to generate second node, for example, by the decrypting module 514 of the far end node. The second data is encrypted again at the second node at 708, based on, for example the same encryption key used for encrypting the first data. This may be performed by the encrypting module 512 of the far end node. At 710, the encrypted second data is sent back to the first node over the network through the encryption pathway. This may be performed by the routing module 516 of the far end node. At 712, the encrypted second node is decrypted, for example, by the decrypting module 504 of the near end node, to generate third data. At 714, the first data is compared with the third data at the near end node to determine the heath of the encryption pathway. This may be performed by the comparing module 508. At 716, whether the first and third data match each other according to a criterion is determined. If there is a match, then the encryption pathway is healthy. Otherwise, the encryption pathway between the pair of nodes is not healthy. As described above, the health check procedure may be performed on a regular basis, and thus, the exemplary process in FIG. 7 may be repeated continuously.

Figure 8:
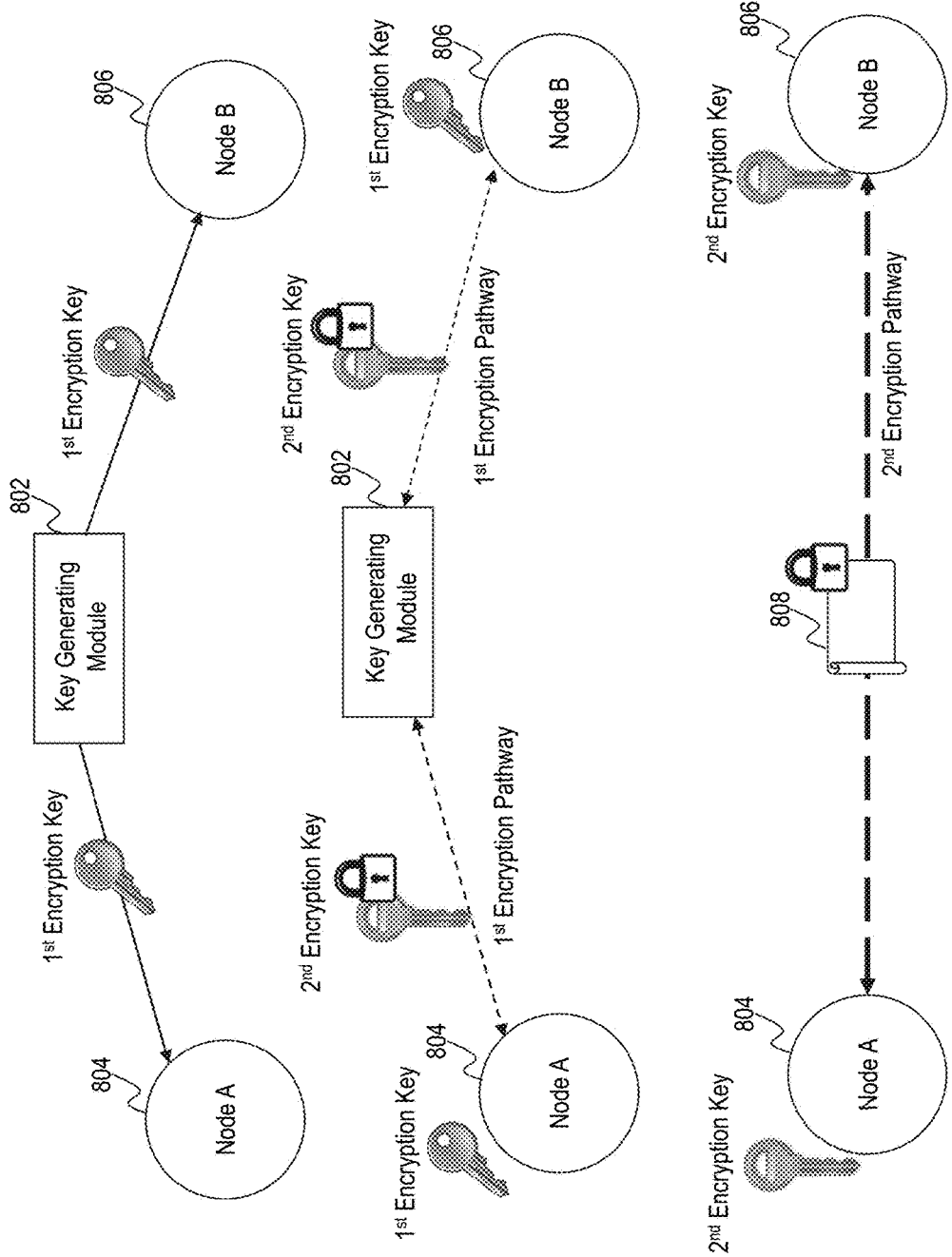
FIG. 8 depicts exemplary encryption pathways established based on initial and subsequent encryption keys, according to an embodiment of the present teaching.

FIG. 8 depicts exemplary encryption pathways established based on initial and subsequent encryption keys, according to an embodiment of the present teaching. As described above, one aspect of the present teaching relates to establishment of a bi-directional encryption pathway between a pair of nodes, which transmits data traffic encrypted based on encryption keys known only by the pair of nodes. In this embodiment, a randomized, zero knowledge encryption key generation process and an encryption pathway bootstrapping process are disclosed. A key generating module 802 implemented on the key server 110 first generates a first encryption key that is unique for the pair of node A 804 and node B 806. That is, for different pairs of nodes, their first encryption keys are different. In one example, the key generating module 802 may be implemented based on GODI protocol or any suitable cryptographic protocol for key management. In this embodiment, the first encryption key is a randomly generated character string. The first encryption key in one example may be long enough to be unmemorable by normal human beings, such as including at least 64 random characters. Once node A 804 and node B 806 obtain the first encryption key, a first encryption pathway is established between the key generating module 802 and node A 804 and between the key generating module 802 and node B 806.

In this embodiment, the key generating module 802 then dynamically generates a second encryption key that is different from the first encryption key. The second encryption key is encrypted by the first encryption key and provided to node A 804 and node B 806 through the first encryption pathway. In this embodiment, the first encryption key is used for bootstrapping purpose only and is dropped once the second encryption key is received by node A 804 and node B 806. A second encryption pathway is established between node A 804 and node B 806 based on the second encryption key. Data traffic 808 between node A 804 and node B 806 is then encrypted based on the second encryption key and transmitted through the second encryption pathway. In this embodiment, an existing second encryption key may be replaced by a new second encryption key from the key generating module 802 at a regular interval to further ensure the security and privacy of data traffic through the second encryption pathway.

Figure 9:
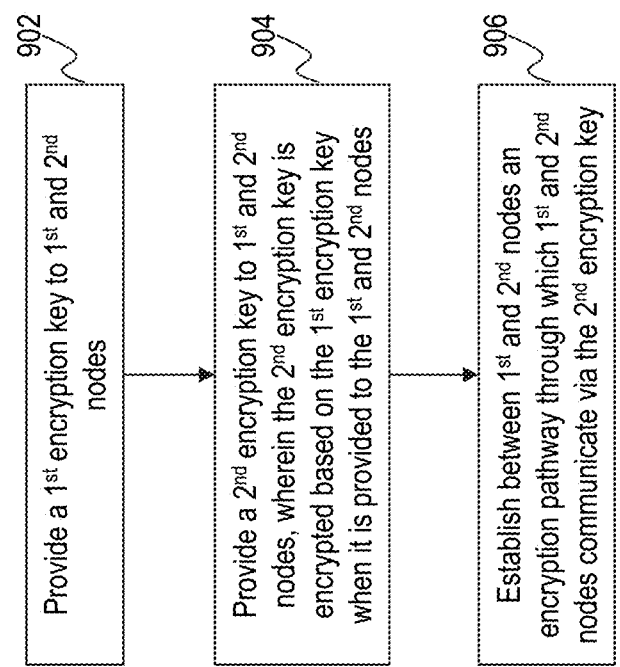
FIG. 9 is a flowchart of an exemplary process for data traffic encryption, according to an embodiment of the present teaching.

FIG. 9 is a flowchart of an exemplary process for data traffic encryption, according to an embodiment of the present teaching. At 902, a first encryption key is provided, for example, by the key generating module 802, to a first node and a second node. An initial, bootstrap encryption pathway is then established between the key generating module 802 and each of the first and second nodes based on the first encryption key. The first encryption key may be a randomly generated character string that is unique for the first and second nodes. At 904, a second encryption key is provided, for example, by the key generating module 802, to the first and second nodes through the first encryption pathway. The second encryption key is encrypted based on the first encryption key when it is provided to the first and second nodes from the key generating module 802. In one example, the first encryption key is dropped once the second encryption key is received and validated at the first and second nodes. An existing second encryption key may be replaced by a new one from the key generating module 802 on a regular basis. At 906, an encryption pathway between the first and second nodes is then established. The first and second nodes communication through the encryption pathway via the second encryption key.

Figure 10:
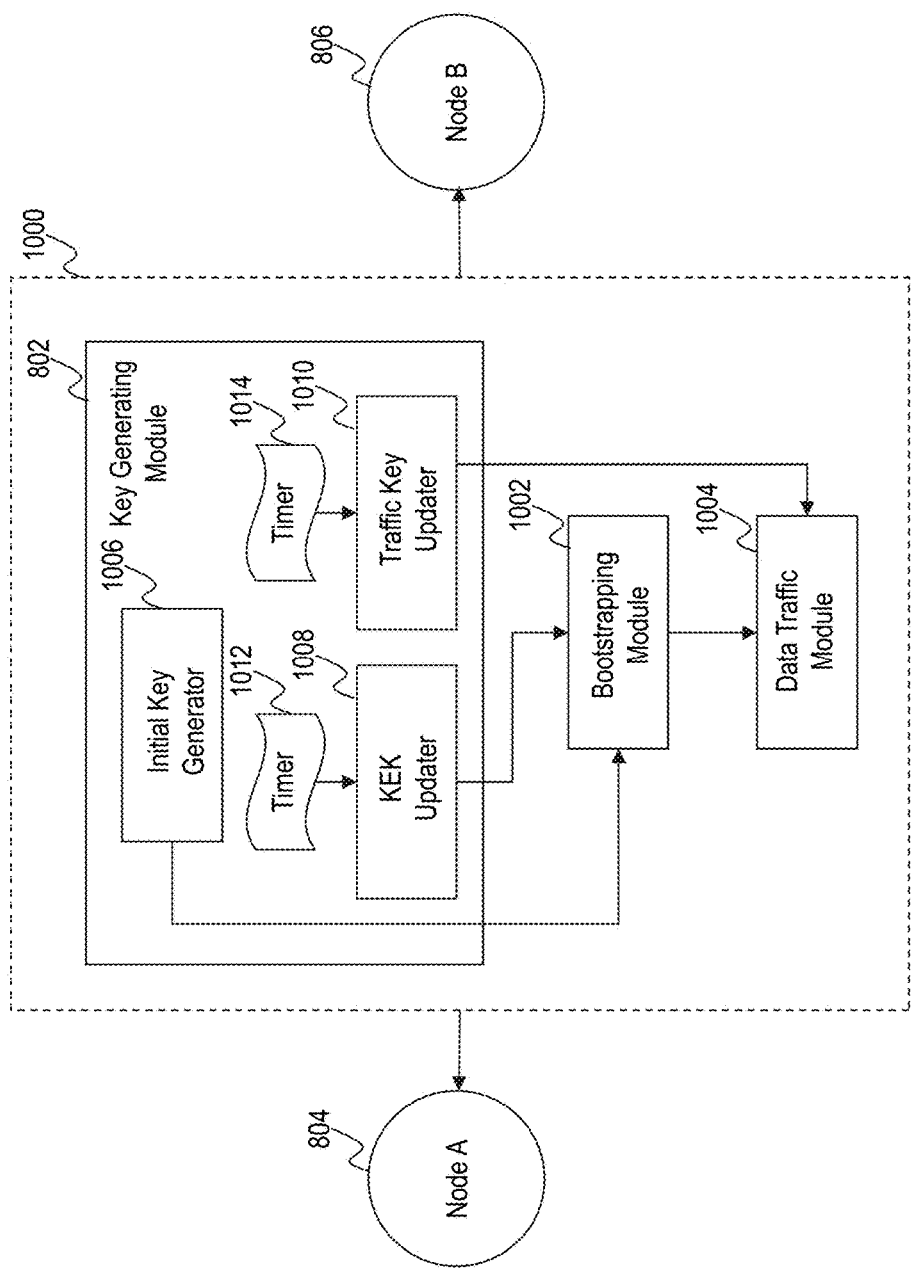
FIG. 10 is an exemplary system diagram of a system for data traffic encryption, according to an embodiment of the present teaching.

FIG. 10 is an exemplary system diagram of a system for data traffic encryption, according to an embodiment of the present teaching. The system 1000 in his embodiment is configured to bootstrap data traffic encryption between node A 804 and node B 806 by providing initial and subsequent encryption key(s) to node A 804 and node B 806. The system 1000 in this embodiment includes the key generating module 802, a bootstrapping module 1002, and a data traffic module 1004. Each of the modules referred to in this embodiment may be any suitable software, hardware, firmware or any suitable combination thereof that can perform the desired function as described below. The key generating module 802 in this embodiment includes an initial key generator 1006, a key encryption key (KEK) updater 1008, and a traffic key updater 1010. The initial key generator 1006 is configured to generate a randomized character string that is unique for each pair of nodes. In one example, the string has 64 characters. Other initial configurations besides the initial key may be automatically generated by the initial key generator 1006. The initial key may be rotated to new random values at a moment's notice by re-invoking the configuration script of the initial key generator 1006. The KEK updater 1008 is configured to generate and update a KEK for each pair of nodes use for encrypting the actual traffic key. The KEK itself may be encrypted based on the initial key. The KEK updater 1008 replaces an existing KEK with a new one according to a timer 1012 at a regular interval. The traffic key updater 1010 is configured to generate and update the traffic key for each pair of nodes used for encrypting the actual data traffic between the pair of nodes. The traffic key may be encrypted based on the initial key when it is provided to the pair of nodes. The traffic key updater 1010 replaces an existing traffic key with a new traffic key according to a timer 1014 at a regular interval.

The bootstrapping module 1002 in this embodiment is configured to establish an initial encryption pathway between the key generating module 802 and node A 804 and between the key generating module 802 and node B 806 based on the initial key provided by the initial key generator 1006. The bootstrapping module 1002 may further provide the updated KEK and/or traffic key to node A 804 and node B 806 through the initial encryption pathway on regular basis. Once the KEK is received and validated by node A 804 and node B 806, the bootstrapping module 1002 may drop the initial key. The data traffic module 1004 in this embodiment is configured to establish the actual encryption pathway between node A 804 and node B 806 based on the traffic key. Subsequent data traffic is encrypted based on the traffic key and transmitted through the actual encryption pathway. In one example, each of the bootstrapping module 1002 and the data traffic module 1004 may include various sub-modules for encryption, decryption, and routing, such as the encryption/decryption devices and modules and routing devices and modules described above with respect to FIGS. 2 and 5.

Figure 11:
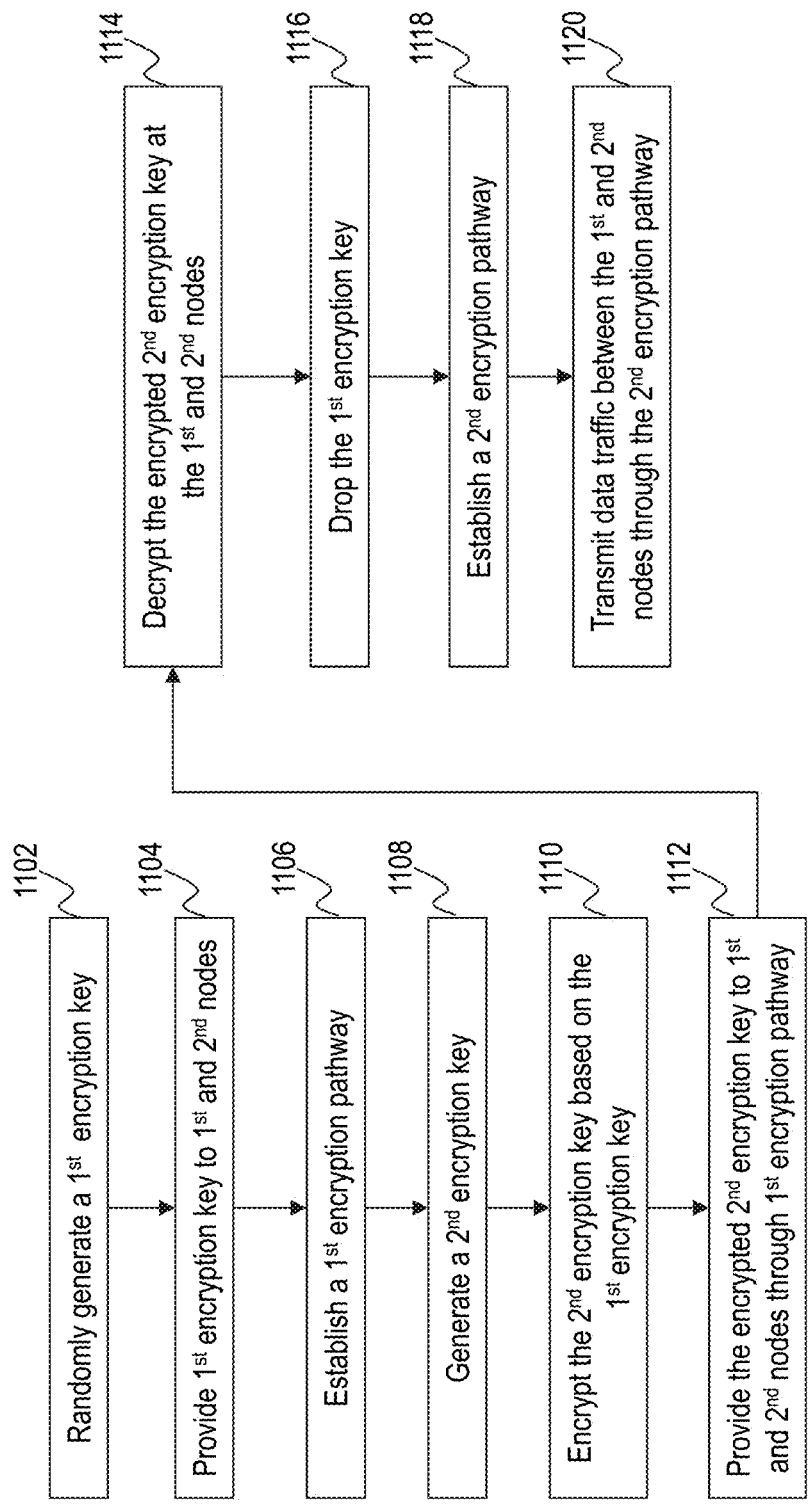
FIG. 11 is a flowchart of another exemplary process for data traffic encryption, according to an embodiment of the present teaching.

FIG. 11 is a flowchart of another exemplary process for data traffic encryption, according to an embodiment of the present teaching. Starting at 1102, a first encryption key is randomly generated for a first node and a second node. At 1104, the first encryption key is provided to the first and second nodes. 1102 and 1104 may be performed by the key generating module 802. At 1106, a first encryption pathway is established between the key generating module 802 and the first node and between the key generating module 802 and the second node, for example, the bootstrapping module 1002. At 1108, a second encryption key is dynamically generated, for example, by the key generating module 802 as well. At 1110, the second encryption key is encrypted based on the first encryption key. The encrypted second encryption key is provided to the first and second nodes through the first encryption pathway at 1112. At 1114, the encrypted second encryption key is decrypted at each of the first and second nodes such that the second encryption key becomes known to the first and second nodes. At 1116, the first encryption key is dropped once the second encryption key is received and validated at the first and second nodes. 1110-1116 may be performed at least in part by the bootstrapping module 1002. At 1118, a second encryption pathway is established between the first and second nodes. At 1120, data traffic is encrypted based on the second encryption key and transmitted between the first and second nodes through the second encryption pathway. 1118 and 1120 may be performed by the data traffic module 1004.

Figure 12:
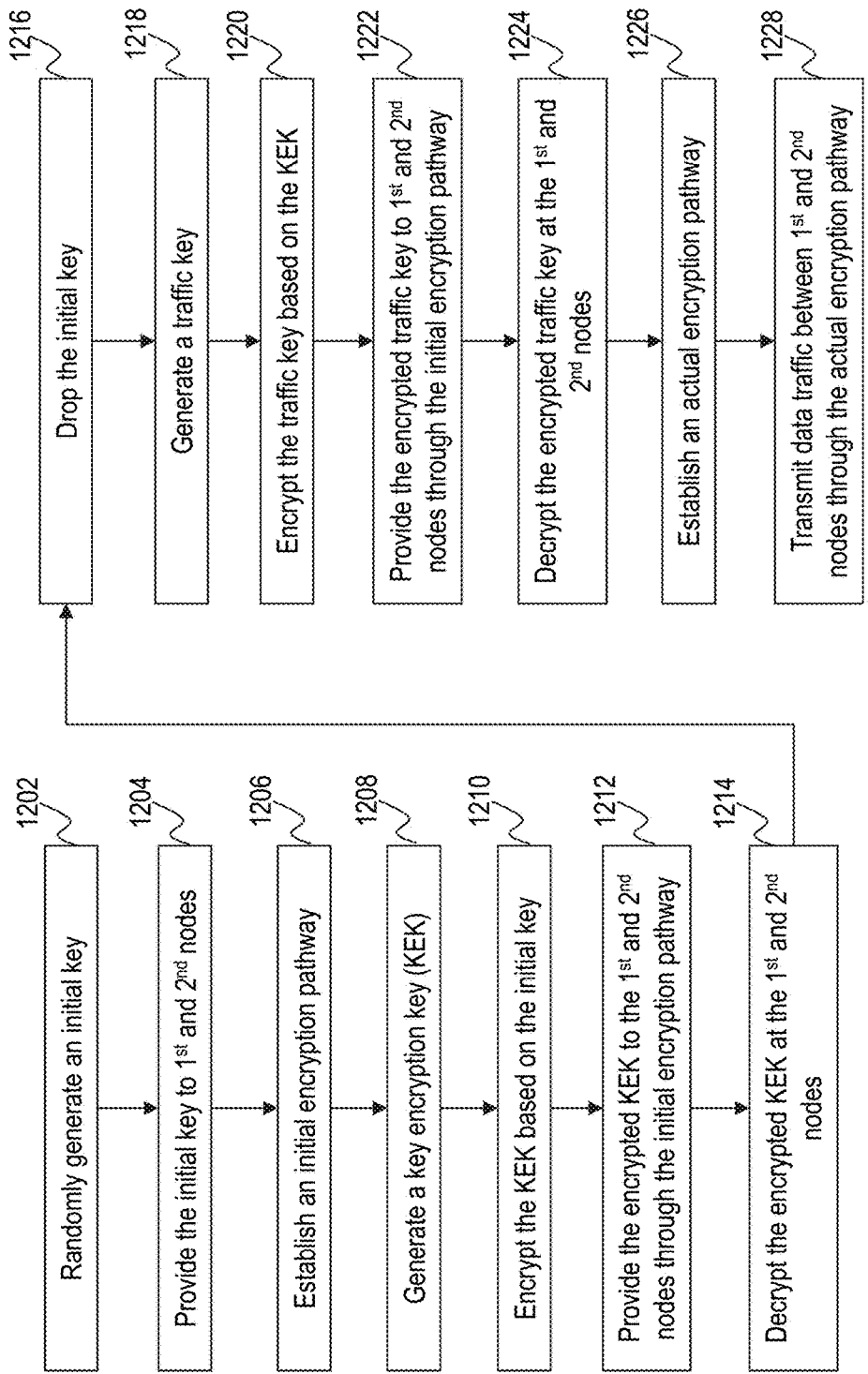
FIG. 12 is a flowchart of still another exemplary process for data traffic encryption, according to an embodiment of the present teaching.

FIG. 12 is a flowchart of still another exemplary process for data traffic encryption, according to an embodiment of the present teaching. Starting at 1202, an initial key is randomly generated. In this example, the initial key includes 64 random characters that are unique for a pair of nodes. At 1204, the initial key is provided to the pair of nodes. At 1206, an initial encryption pathway is established between the key generating module 802 and each of the pair of nodes. At 1208, a KEK is dynamically generated. In one example, the KEK is an RSA key used for RSA encryption, which is a known public-key cryptography algorithm using prime factorization as the trapdoor one-way function. The RSA algorithm is based on the fact that there is no efficient way to factor very large numbers. Deducing an RSA key, therefore, may require an extraordinary amount of computer processing power and time. At 1210, the KEK itself is encrypted based on the initial key. At 1212, the encrypted KEK is provided to the pair of nodes through the initial encryption pathway. In this embodiment, the KEK may be updated on a regular basis. In one example, an existing KEK is replaced by a new one every 13 hours. The updated KEK may be provided to the pair of nodes through the initial encryption pathway. At 1214, the encrypted KEK is decrypted at each of the pair of nodes based on the initial key. At 1216, the initial key is dropped once the KEK is received and validated at each of the pair of nodes. At 1218, a traffic key is dynamically generated, which is the actual encryption key for data traffic encryption. At 1220, the traffic key is encrypted based on the KEK. At 1222, the encrypted traffic key is provided to the pair of nodes. In this embodiment, the traffic key may be updated on a regular basis. In one example, an existing traffic key is replaced by a new traffic key every 6 hours. The updated traffic key may be encrypted based on the KEK and provided to the pair of nodes through the initial encryption pathway. At 1224, the encrypted traffic key is decrypted at each of the pair of nodes based on the KEK known to the nodes. At 1226, the actual encryption pathway between the pair of nodes is established. At 1228, data traffic between the pair of nodes is encrypted based on the traffic key and transmitted through the actual encryption pathway when the actual encryption pathway is healthy.

Figure 13:
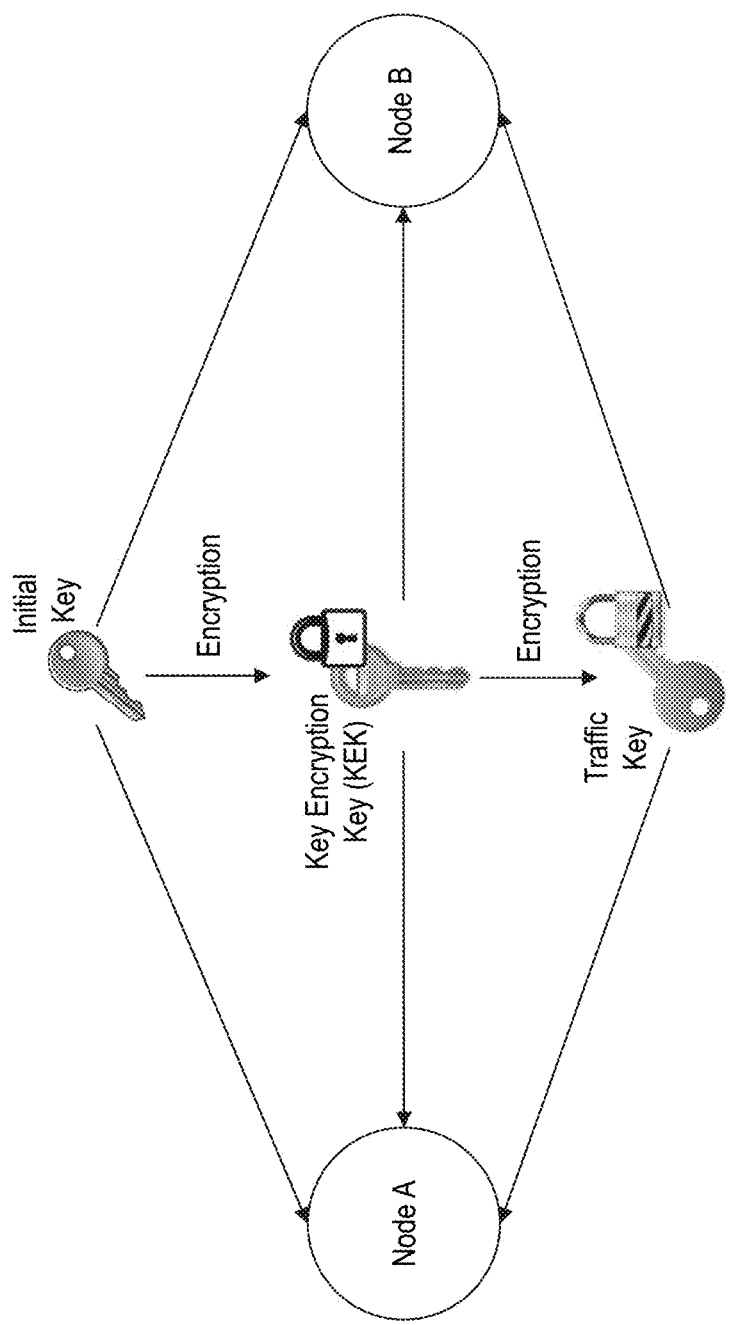
FIG. 13 depicts exemplary initial key, key encryption key, and traffic key used for establishing an encryption pathway between two nodes, according to an embodiment of the present teaching.

FIG. 13 depicts exemplary initial key, KEK, and traffic key used for establishing an encryption pathway between two nodes, according to an embodiment of the present teaching. FIG. 13 shows a progression of three different states of the system 1000 over time: the top state is the bootstrap state, with the initial key; the second key, in the middle represents the state where the KEK being sent from the key generating module 802 to the nodes; and the bottom state is the final running state where the KEK has been used to send the traffic key to the nodes, and actual traffic can flow between the nodes. As shown in FIG. 13, a random initial key is provided to a pair of nodes for bootstrapping an initial encryption pathway between the key generating module 802 and each of the pair of nodes. The initial key is used for encrypting the KEK, which may be updated at a first regular interval. The encrypted KEK is provided to the pair of nodes through the initial encryption pathway. A third key, which is a traffic key for actual data traffic encryption, is encrypted based on the KEK and provided to the pair of nodes through the initial encryption pathway as well. The initial key may be dropped as soon as the first KEK is received and validated at the pair of nodes. The traffic key may be updated at a second regular interval, which, in one example, is shorter than the first regular interval for updating the KEK.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 14:
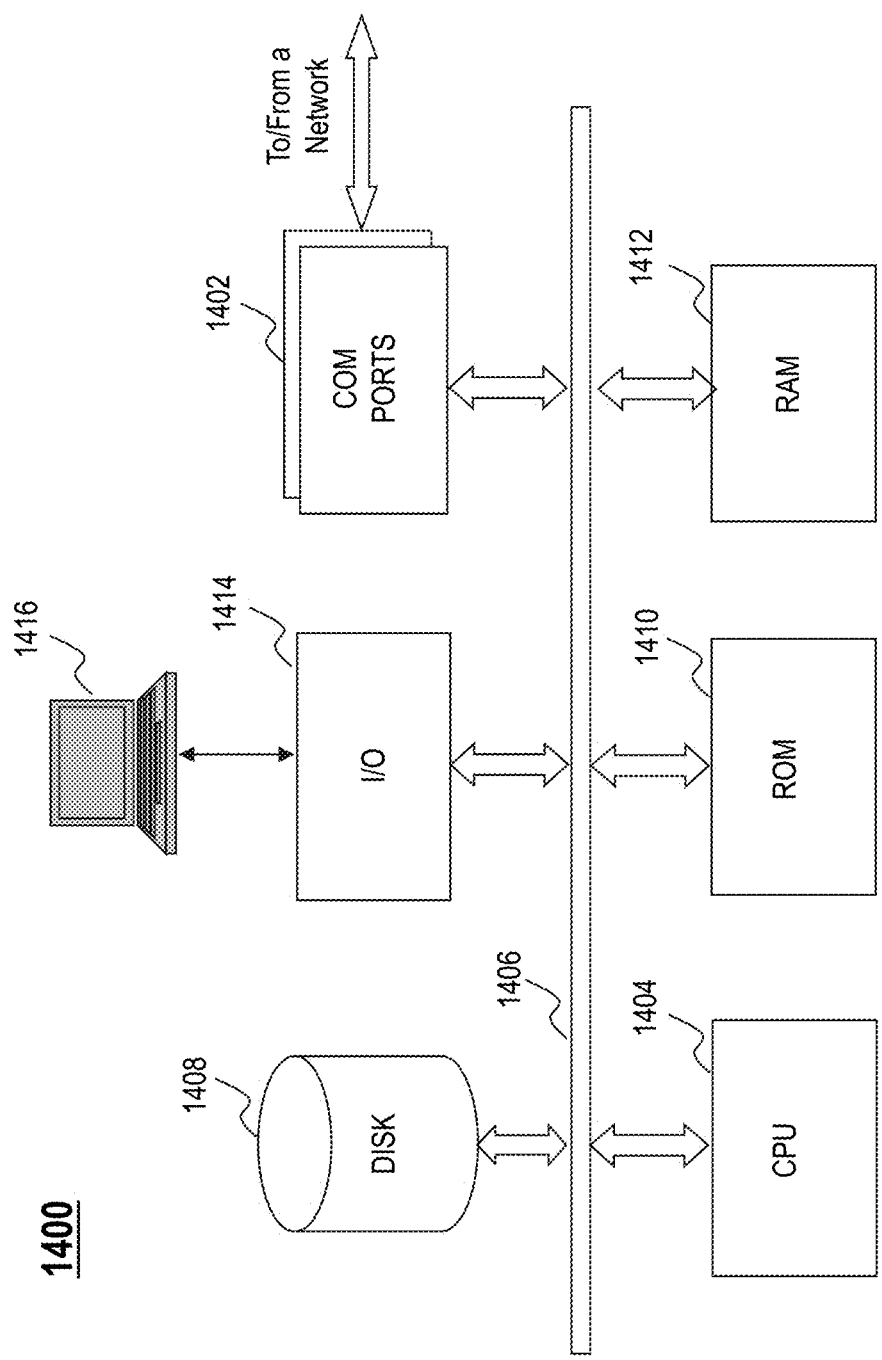
FIG. 14 depicts a general computer architecture on which the present teaching can be implemented.

FIG. 14 depicts a general computer architecture on which the present teaching can be implemented and has a functional block diagram illustration of a computer hardware platform that includes user interface elements. The computer may be a general-purpose computer or a special purpose computer. This computer 1400 can be used to implement any components of the data traffic control and encryption architecture as described herein. Different components of the systems disclosed in the present teaching can all be implemented on one or more computers such as computer 1400, via its hardware, software program, firmware, or a combination thereof. Although only one such computer is shown, for convenience, the computer functions relating to search suggestion may be implemented in a distributed fashion on a number of similar platforms, to distribute the processing load.

The computer 1400, for example, includes COM ports 1402 connected to and from a network connected thereto to facilitate data communications. The computer 1400 also includes a CPU 1404, in the form of one or more processors, for executing program instructions. The exemplary computer platform includes an internal communication bus 1406, program storage and data storage of different forms, e.g., disk 1408, read only memory (ROM) 1410, or random access memory (RAM) 1412, for various data files to be processed and/or communicated by the computer, as well as possibly program instructions to be executed by the CPU 1404. The computer 1400 also includes an I/O component 1414, supporting input/output flows between the computer and other components therein such as user interface elements 1416. The computer 1400 may also receive programming and data via network communications.

Hence, aspects of the methods of data traffic control and encryption, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the units of the host and the client nodes as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on at least one machine each of which has at least one processor, storage, and a communication platform connected to a network for data traffic control, the method comprising:
   receiving data traffic from a first node to be sent to a second node;
   determining, at regular time intervals, a status for normal operation of a first pathway by verifying whether test data can be communicated using the first pathway between the first node and the second node, the verifying including determining within a time-out period, whether test data can be encrypted and transmitted over the first pathway from the first node to the second node, and whether test data that is decrypted, encrypted, and transmitted by the second node can be received by the first node over the first pathway, wherein the test data is encrypted based on a unique encryption key associated with each time interval; and transmitting the data traffic through a second pathway to the second node over the network without using the first pathway based on the status for normal operation of the first pathway not being determined within the time-out period, the second pathway being different from the first pathway.

2. The method of claim 1, further comprising sending the data traffic to the second node over the network using the first pathway when the status for normal operation of the first pathway is determined.

3. The method of claim 1, wherein the second pathway is a non-encrypted pathway.

4. The method of claim 1, wherein a magnitude of the time-out period is less than the time interval.

5. A system including storage, and a communication platform connected to a network for data traffic control, the system comprising:
  at least one processor configured to:
    determine, at regular time intervals, a status for normal operation of a first pathway by verifying whether test data can be communicated using the first pathway between a first node and a second node, the verifying including determining within a time-out period, whether test data can be encrypted and transmitted over the first pathway from the first node to the second node, and whether test data that is decrypted, encrypted, and transmitted by the second node can be received by the first node over the first pathway, wherein the test data is encrypted based on a unique encryption key associated with each time interval; and
    transmit data traffic received from the first node through a second pathway to the second node over the network without using the first pathway based on the status for normal operation of the first pathway not being determined within the time-out period, the second pathway being different from the first pathway.

6. The system of claim 5, wherein the at least one processor is further configured to send the data traffic to the second node over the network using the first pathway when the status for normal operation of the first pathway is determined.

7. A non-transitory machine-readable medium having information recorded thereon for data traffic control, wherein the information, when read by the machine, causes the machine to perform the following:
  receiving data traffic from a first node to be sent to a second node;
  determining, at regular time intervals, a status for normal operation of a first pathway by verifying whether test data can be communicated using the first pathway between the first node and the second node, the verifying including determining within a time-out period, whether test data can be encrypted and transmitted over the first pathway from the first node to the second node, and whether test data that is decrypted, encrypted, and transmitted by the second node can be received by the first node over the first pathway, wherein the test data is encrypted based on a unique encryption key associated with each time interval; and
  transmitting the data traffic through a second pathway to the second node over the network without using the first pathway based on the status for normal operation of the first pathway not being determined within the time-out period, the second pathway being different from the first pathway.

8. A system for data traffic control comprising:
  means for receiving data traffic from a first node to be sent to a second node;
  means for determining, at regular time intervals, a status for normal operation of a first pathway by verifying whether test data can be communicated using the first pathway between the first node and the second node, the verifying including determining within a time-out period, whether test data can be encrypted and transmitted over the first pathway from the first node to the second node, and whether test data that is decrypted, encrypted, and transmitted by the second node can be received by the first node over the first pathway, wherein the test data is encrypted based on a unique encryption key associated with each time interval; and
  means for transmitting the data traffic through a second pathway to the second node over the network without using the first pathway based on the status for normal operation of the first pathway not being determined within the time-out period, the second pathway being different from the first pathway.

9. A method implemented on at least one machine each of which has at least one processor, storage, and a communication platform connected to a network for controlling data traffic, the method comprising:
  encrypting first data at a first node;
  transmitting the encrypted first data to a second node over the network using a first pathway;
  decrypting the encrypted first data to generate second data at the second node;
  encrypting the second data at the second node;
  transmitting the encrypted second data to the first node over the network using the first pathway;
  decrypting the received encrypted second data to generate third data at the first node;
  comparing, at regular time intervals, the first data with the third data at the first node to determine, within a time-out period, a status for normal operation of the first pathway, wherein the first data and the second data are encrypted based on a unique encryption key associated with each time interval; and
  transmitting the data traffic through a second pathway to the second node over the network without using the first pathway in response to the first data not matching the third data, the second pathway being different from the first pathway.

10. The method of claim 9, wherein the status for normal operation of the first pathway is determined based on the first data matching the third data according to at least one criterion.

11. The method of claim 9, wherein the first data is at least one of a test message and data included in the data traffic.

12. A system including storage, and a communication platform connected to a network for controlling data traffic, the system comprising:
  at least one processor configured to:
    encrypt first data at a first node,
    transmit the encrypted first data to a second node over the network using a first pathway for transmitting encrypted data,
    decrypt, at the second node, the received encrypted first data to generate second data, encrypt the second data, transmit the encrypted second data to the first node over the network using the first pathway, decrypt the received encrypted second data to generate third data, compare, at regular time intervals, the first data with the third data to determine, within a time-out period, a status for normal operation of the first pathway, wherein the first data and the second data are encrypted based on a unique encryption key associated with each time interval, and transmit the data traffic through a second pathway to the second node over the network without using the first pathway in response to the first data not matching the third data, the second pathway being different from the first pathway.

13. The system of claim 12, wherein the status for normal operation of the first pathway is determined based on the first data matching the third data according to at least one criterion.

14. The system of claim 12, wherein the first data is at least one of a test message and data included in the data traffic.

15. A non-transitory machine-readable medium having information recorded thereon for controlling data traffic, wherein the information, when read by the machine, causes the machine to perform the following:

encrypting first data at a first node;

transmitting the encrypted first data to a second node over the network using a first pathway;

decrypting the encrypted first data to generate second data at the second node;

encrypting the second data at the second node;

transmitting the encrypted second data to the first node over the network using the first pathway;

decrypting the received encrypted second data to generate third data at the first node;

comparing, at regular time intervals, the first data with the third data at the first node to determine, within a time-out period, a status for normal operation of the first pathway, wherein the first data and the second data are encrypted based on a unique encryption key associated with each time interval; and transmitting the data traffic through a second pathway to the second node over the network without using the first pathway in response to the first data not matching the third data, the second pathway being different from the first pathway.

16. A system for controlling data traffic, the system comprising:

means for encrypting first data of data traffic at a first node;

means for transmitting the encrypted first data to a second node over the network using a first pathway;

means for decrypting the encrypted first data to generate second data at the second node;

means for encrypting the second data at the second node;

means for transmitting the encrypted second data to the first node over the network using the first pathway;

means for decrypting the received encrypted second data to generate third data at the first node;

means for comparing, at regular time intervals, the first data with the third data at the first node to determine, within a time-out period, a status for normal operation of the first pathway, wherein the first data and the second data are encrypted based on a unique encryption key associated with each time interval; and means for transmitting the data traffic through a second pathway to the second node over the network without using the first pathway in response to the first data not matching the third data, the second pathway being different from the first pathway.

17. A method implemented on at least one machine each of which has at least one processor, storage, and a communication platform connected to a network for determining status of a first pathway, the method comprising:

receiving encrypted first data from a node over the network through the first pathway;

decrypting the encrypted first data to generate second data;

encrypting the second data;

transmitting the encrypted second data to the node over the network through the first pathway to determine, within a time-out period, the status of the first pathway, wherein the first data and the second data are encrypted based on a unique encryption key associated with each time interval, and the receiving, the decrypting, the encrypting and the transmitting are performed at regular time intervals; and receiving from the node, data traffic through a second pathway over the network without using the first pathway in response to the status of the first pathway not being determined, the second pathway being different from the first pathway.

18. The method of claim 17, wherein the first data is at least one of a test message and data included in the data traffic.

19. A system including a storage, and a communication platform connected to a network for determining status of a first pathway, the system comprising:

at least one processor configured to:

receive encrypted first data from a node over the network through the first pathway, decrypt the encrypted first data to generate second data, encrypt the second data, transmit the encrypted second data to the node over the network through the first pathway to determine, within a time-out period, the status of the first pathway, wherein the first data and the second data are encrypted based on a unique encryption key associated with each time interval, wherein the at least one processor is configured to receive, decrypt, encrypt, and transmit at regular time intervals, and receive from the node, data traffic through a second pathway over the network without using the first pathway in response to the status of the first pathway not being determined, the second pathway being different from the first pathway.

20. The system of claim 19, wherein the first data is at least one of a test message and data included in the data traffic.

21. A non-transitory machine-readable medium having information recorded thereon for determining status of a first pathway, wherein the information, when read by the machine, causes the machine to perform the following:

receiving encrypted first data from a node over the network through the first pathway;

decrypting the encrypted first data to generate second data;

encrypting the second data;

transmitting the encrypted second data to the node over the network through the first pathway to determine, within a time-out period, the status of the first pathway, wherein the first data and the second data are encrypted based on a unique encryption key associated with each time interval, and the receiving, the decrypting, the encrypting and the transmitting are performed at regular time intervals; and receiving from the node, data traffic through a second pathway over the network without using the first pathway in response to the status of the first pathway not being determined, the second pathway being different from the first pathway.

22. A method implemented on at least one machine each of which has at least one processor, storage, and a communication platform connected to a network for determining a status of a first pathway, the method comprising:

encrypting first data of data traffic;

transmitting the encrypted first data to a node over the network using the first pathway;

receiving encrypted second data from the node over the network through the first pathway, wherein the second data is decrypted from the encrypted first data;

decrypting the received encrypted second data to generate third data;

comparing, at regular time intervals, the first data with the third data to determine, within a time-out period, the status of the first pathway, wherein the first data and the second data are encrypted based on a unique encryption key associated with each time interval; and transmitting the data traffic through a second pathway to the node over the network without using the first pathway in response to the first data not matching the third data, the second pathway being different from the first pathway.

23. The method of claim 22, wherein the status of the first pathway to the node is determined based on the first data matching the third data according to at least one criterion.

24. The method of claim 22, wherein the first data is at least one of a test message and data included in the data traffic.

25. A system including a storage, and a communication platform connected to a network for determining a status of a first pathway, the system comprising:

at least one processor configured to:

encrypt first data of data traffic, transmit the encrypted first data to a node over the network using the first pathway, receive encrypted second data from the node over the network through the first pathway, wherein the second data is decrypted from the encrypted first data, decrypt the received encrypted second data to generate third data, compare, at regular time intervals, the first data with the third data to determine, within a time-out period, the status of the first pathway, wherein the first data and the second data are encrypted based on a unique encryption key associated with each time interval, and transmit the data traffic through a second pathway to the node over the network without using the first pathway in response to the first data not matching the third data, the second pathway being different from the first pathway.

26. The system of claim 25, wherein the status of the first pathway is determined based on the first data matching the third data according to at least one criterion.

27. The system of claim 25, wherein the first data is at least one of a test message and data included in the data traffic.

28. A non-transitory machine-readable medium having information recorded thereon for determining a status of a first pathway, wherein the information, when read by the machine, causes the machine to perform the following:

encrypting first data of data traffic;

transmitting the encrypted first data to a node over the network using the first pathway;

receiving encrypted second data from the node over the network through the first pathway, wherein the second data is decrypted from the encrypted first data;

decrypting the received encrypted second data to generate third data;

comparing, at regular time intervals, the first data with the third data to determine, within a time-out period, the status of the first pathway, wherein the first data and the second data are encrypted based on a unique encryption key associated with each time interval; and transmitting the data traffic through a second pathway to the node over the network without using the first pathway in response to the first data not matching the third data, the second pathway being different from the first pathway.

* * * * *